(12) United States Patent
Gleason et al.

(10) Patent No.: US 7,431,969 B2
(45) Date of Patent: Oct. 7, 2008

(54) CHEMICAL VAPOR DEPOSITION OF HYDROGEL FILMS

(75) Inventors: Karen K. Gleason, Lexington, MA (US); Kelvin Chan, Santa Clara, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 248 days.

(21) Appl. No.: 11/198,932

(22) Filed: Aug. 5, 2005

(65) Prior Publication Data

US 2007/0032620 A1    Feb. 8, 2007

(51) Int. Cl.
C23C 16/00    (2006.01)
(52) U.S. Cl. .................. 427/255.6; 427/255.28
(58) Field of Classification Search ........... 427/255.28, 427/255.6, 248.1
See application file for complete search history.

(56) References Cited

U.S. PATENT DOCUMENTS

| | | | |
|---|---|---|---|
| 5,888,591 A | 3/1999 | Gleason et al. | |
| 6,045,877 A | 4/2000 | Gleason et al. | |
| 6,153,269 A | 11/2000 | Gleason et al. | |
| 6,156,435 A | 12/2000 | Gleason et al. | |
| 6,335,382 B1 | 1/2002 | Iida | |
| 6,420,453 B1 * | 7/2002 | Bowers et al. | 523/106 |
| 6,509,138 B2 | 1/2003 | Gleason et al. | |
| 6,709,980 B2 | 3/2004 | Gleason | |
| 6,887,578 B2 | 5/2005 | Gleason et al. | |
| 6,946,736 B2 | 9/2005 | Gleason et al. | |
| 7,112,615 B2 | 9/2006 | Gleason et al. | |
| 7,230,048 B1 * | 6/2007 | Schatz et al. | 525/53 |
| 2002/0012884 A1 | 1/2002 | Gleason et al. | |
| 2003/0091935 A1 | 5/2003 | Gleason et al. | |

(Continued)

FOREIGN PATENT DOCUMENTS

EP    0995762    4/2000

(Continued)

OTHER PUBLICATIONS

Mao et al, Hot filament chemical vapor deposition of poly(glycidyl methacrylate) thin films using tert-butyl peroxide as an initiator, Langmuir 2004, 20, p. 2484-2488.*

(Continued)

*Primary Examiner*—Timothy Meeks
*Assistant Examiner*—Elizabeth A Burkhart
(74) *Attorney, Agent, or Firm*—Dana M. Gordon; Foley Hoag LLP

(57) ABSTRACT

In one embodiment of the invention, iCVD is used to form linear thin films using a radical initiator and an alkene. In another embodiment, iCVD is used to form crosslinked thin films by the addition of a crosslinking agent (e.g., a diacrylate or a dimethyacrylate). The incorporation of a crosslinking agent into the thin films is shown to increase systematically with its partial pressure. In one embodiment, when the crosslinker is EDGA and the monomer is HEMA it results in crosslinked P(HEMA-co-EGDA) copolymer. In another embodiment, when the crosslinker is EDGA and the monomer is VP, it results in crosslinked P(VP-co-EGDA). Disclosed are the effects of crosslinker incorporation on the thermal and the wetting properties of the polymers. The unique swelling properties of these films are also described; certain films of the present invention are hydrogels when soaked in water.

17 Claims, 22 Drawing Sheets

| chemical structure | acronym | chemical name |
|---|---|---|
| | HEMA | 2-hydroxyethyl methacrylate |
| | VP | 1-vinyl-2-pyrrolidone |
| | | N,N-dimethylacrylamide |
| | | acrylic acid |
| | | N-isopropylacrylamide |
| | | itaconic acid |
| | | 2-hydroxyethylacrylate |
| | VA | vinyl alcohol |
| | | vinyl acetate |
| | | methacrylic acid |
| | | acrylamide |

U.S. PATENT DOCUMENTS

| | | | |
|---|---|---|---|
| 2003/0138645 | A1 | 7/2003 | Gleason et al. |
| 2003/0215203 | A1 | 11/2003 | Lock et al. |
| 2003/0219976 | A1 | 11/2003 | Gleason |
| 2004/0137243 | A1 | 7/2004 | Gleason et al. |
| 2004/0249006 | A1 | 12/2004 | Gleason et al. |
| 2006/0040053 | A1 | 2/2006 | Gleason et al. |
| 2006/0228966 | A1 | 10/2006 | Gleason et al. |

FOREIGN PATENT DOCUMENTS

| | | |
|---|---|---|
| WO | WO-2006/110540 A2 | 10/2006 |

OTHER PUBLICATIONS

Ali, A. H. et al., "Studies on the Thermal Degradation fo Acrylic Polymers by Simultaneous Autostep TG/DTA", *Pure Appl. Chem.*, A34(2):235-246 (1997).

Arica, M. Y., et al., "Invertase Immobilized on Spacer-Arm Attached Poly(hydroxyethyl methacrylate) Membrane: Preparation and Properties", *Journ. of Appl. Polymer Sci.*, 75:1685-1692 (2000).

Davis, T. P. et al., "Effect of crosslinking on the properties of poly(2-hydroxyethyl methacrylate) hydrogels", *Die Angewant. Makromol. Chemie*, 189(3201):195-205 (1991).

Demirelli, K. et al., "A detailed study of thermal degradation of poly(2-hydroxyethyl methacrylate)", *Polymer Degradation and Stability*, 72:75-80 (2001).

Demirelli, K. et al., "Investigation of the thermal decomposition of poly(2-hydroxyethyl methacrylate)", *Polymer Degradation and Stability*, 78:333-339 (2002).

Gengenbach, T. R. et al., "Compositional Changes in Plasma-deposited Fluorocarbon Films during Ageing", *Surf. Interface Anal.*, 26:498-511 (1998).

Hermitte, L. et al., "Contribution of the comonomers to the bulk and surface properties of methacrylate copolymers", *Journal of Colloid and Interface Science*, 272:82-89 (2004).

Levchik, G. F. et al., "The correlation between cross-linking and thermal stability: Cross-linked polystyrenes and polymethacrylates", *Polymer Degradation and Stability*, 65:395-403 (1999).

Martinez, G. et al., "Thermal degradation behaviour of 2-hydroxyethyl methacrylate-*tert*-butyl acrylate copolymers", *Polymer Degradation and Stability*. 76:205-210 (2002).

Tang, Y. et al., "Swelling of Zwitterionic Polymer Films Characterized by Spectroscopic Ellipsometry", *Macromolecules*, 34:8768-8776 (2001).

Tarducci, C. et al., "Monomolecular Functionalization of Pulsed Plasma Deposited Poly(2-hydroxyethyl methacrylate) Surfaces", *Chem. Mater.*, 14:2541-2545 (2002).

Tonge, S. et al., "The ex vivo wettability of soft contact lenses", *Current Eye Research*, 23(1):51-59 (2001).

Yasutake, et al.; "Physically Controlled Radical Polymerization of Vaporized Vinyl Monomers on Surfaces. Synthesis of Block Copolymers of Methyl Methacrylate and Styrene with a Conventional Free Radical Initiator"; *Macromolecules*; 2003, 36, pp. 5974-5981.

International Search Report PCT/US2006/030873 dated Mar. 30, 2007.

\* cited by examiner

| chemical structure | acronym | chemical name |
|---|---|---|
|  | HEMA | 2-hydroxyethyl methacrylate |
|  | VP | 1-vinyl-2-pyrrolidone |
|  | | N,N-dimethylacrylamide |
|  | | acrylic acid |
|  | | N-isopropylacrylamide |
|  | | itaconic acid |
|  | | 2-hydroxyethylacrylate |
|  | VA | vinyl alcohol |
|  | | vinyl acetate |
|  | | methacrylic acid |
|  | | acrylamide |

Figure 1b

| chemical structure | acronym | chemical name |
|---|---|---|
| (vinyl methyl ether structure) | | vinyl methyl ether |
| (N,N-diethylaminoethyl methacrylate structure) | | N,N-diethylaminoethyl methacrylate |
| (N,N-diethylaminoethyl acrylate structure) | | N,N-diethylaminoethyl acrylate |

| chemical structure | acronym | chemical name |
|---|---|---|
| (EGDA structure) | EGDA | ethylene glycol diacrylate |
| (methylenebisacrylamide structure) | | methylenebis-acrylamide |
| (ethylene glycol dimethacrylate structure) | | ethylene glycol dimethacrylate |

| chemical structure | acronym | chemical name |
|---|---|---|
| —⫠O-O⫠— | TBPO | *tert*-butyl peroxide |
| —⫠O-OH | | *tert*-butyl hydroperoxide |
| —⫠N=N⫠— | | bis(1,1-dimethyl)diazene |

Figure 13

| core level | peak | origin | iCVD film binding energy (eV) | area (%) | PVP reference binding energy (eV) | area (%) |
|---|---|---|---|---|---|---|
| C 1s | 1 | $-CH_x-C^*H_2-CH_x-$ | 285.00 | 33 | 285.00 | 34 |
| | 2 | $-C^*H_2-(C=O)-$ | 285.41 | 17 | 285.36 | 17 |
| | 3 | $-N-C^*H_x-$ | 286.09 | 33 | 286.16 | 33 |
| | 4 | $-C^*=O$ | 287.78 | 17 | 287.79 | 15 |
| O 1s | | | 531.34 | | 531.30 | |
| N 1s | | | 399.89 | | 399.88 | | ns # CHEMICAL VAPOR DEPOSITION OF HYDROGEL FILMS

GOVERNMENT SUPPORT

This invention was made with support provided by the National Science Foundation under Grant DMR-9400334; therefore, the government has certain rights in the invention.

BACKGROUND OF THE INVENTION

Chemical vapor deposition (CVD) is a one-step, vacuum process, involving no solvents or volatiles. Using CVD, monomers are converted directly to desired polymeric films without the need for purification, drying, or curing steps. Custom copolymers can be created simply by changing the ratio of feed gases to the CVD reactor (Murthy, S. K.; Gleason, K. K. *Macromolecules* 2002, 35, 1967). CVD allows films of nanoscale thicknesses with macroscale uniformity to be produced and can be applied to complex geometries (Pierson, H. O. *Handbook of Chemical Vapor Deposition*, 2nd ed.; Noyes Publications: Norwich, N.Y., 1999). CVD can also be used to coat nanoscale features, as there are no surface tension and non-uniform wetting effects that are typically associated with wet processes. Plasma-enhanced CVD (PECVD) is a proven method for producing PHEMA thin films (Tarducci, C.; Schofield, W. C. E.; Badyal, J. P. S. *Chem. Mat.* 2002, 14, 2541). In particular, the pulsation of the plasma on the μs-ms time scale has been found to allow a high degree of retention of hydroxyl groups. Systematic control of crosslink density, however, has not been demonstrated for PECVD.

Initiated CVD (iCVD) can be positioned as a complementary method to PECVD in depositing films with control of crosslink density. In contrast to PECVD, there is no plasma and hence no UV irradiation or ion bombardment during the iCVD process; therefore, the resulting films have lower densities of dangling bonds than films grown using plasma excitation (Limb, S. J.; Lau, K. K. S.; Edell, D. J.; Gleason, E. F.; Gleason, K. K. *Plasmas Polym.* 1999, 4, 21).

The iCVD method is a subset of hot-filament CVD (HFCVD) in which selective thermal decomposition of species is achieved using resistively-heated filament wires. The substrates to be coated are backside-cooled to promote adsorption of growth species. iCVD differs from conventional HFCVD, for example, in that an initiator in addition to the monomer is introduced into the vacuum chemical vapor deposition reactor. Mao and Gleason (Mao, Y.; Gleason, K. K. *Langmuir* 2004, 20, 2484) have demonstrated the iCVD of a methacrylic polymer, poly(glycidyl methacrylate) (PGMA), which is from the same chemical family as PHEMA. Glycidyl methacrylate (GMA) was the monomer, and tert-butyl peroxide (TBPO) was the initiator. Due to the weakness of the peroxy bond in TBPO, very low filament temperatures (180-250° C.) are required to generate radicals for initiation. These radicals serve as starters of polymer chains to which multiple monomer units are added. As a result of low temperatures, the bond-scission chemistry inside the chemical vapor deposition reactor is limited to the fragmentation of TBPO. The pendant epoxide groups are, therefore, preserved in the process, leading to high structural resemblance of iCVD PGMA to solution-polymerized PGMA. The use of an initiator not only allows control of chemistry, but also accelerates film growth and provides molecular-weight and rate control (Mao, Y.; Gleason, K. K. *Langmuir* 2004, 20, 2484; Pryce Lewis, H. G.; Caulfield, J. A.; Gleason, K. K. *Langmuir* 2001, 17, 7652; and Murthy, S. K.; Olsen, B. D.; Gleason, K. K. *Langmuir* 2002, 18, 6424). The energy input is low due to the low filament temperatures (<50 mW/cm$^2$) and the need only to decompose the initiator, but not the monomer. Yet, high growth rates (>100 nm/min) were achieved in the iCVD of PGMA. All these benefits of iCVD position it as an improvement over conventional HFCVD, which already is a proven method for depositing poly(tetrafluoroethylene), polyoxymethylene, organosilicate glass, and fluorocarbon-organosilicon copolymer thin films (Lau, K. K. S.; Gleason, K. K. *J. Fluor. Chem.* 2000, 104, 119; Loo, L. S.; Gleason, K. K. *Electrochem. Solid State Lett.* 2001, 4, G81; Pryce Lewis, H. G.; Casserly, T. B.; Gleason, K. K. *J. Electrochem. Soc.* 2001, 148, F212; and Murthy, S. K.; Gleason, K. K. 2002, 35, 1967.) Radicals in iCVD processes are annihilated through termination. Both disproportionation and coupling reactions eliminate radicals and halt the addition of monomer units to the chains. The recombination of radicals avoids the presence of dangling-bond defects in the resulting polymeric film (Limb, S. J.; Labelle, C. B.; Gleason, K. K.; Edell, D. J.; Gleason, E. F. *Appl. Phys. Lett.* 1996, 68, 2810).

Poly(2-hydroxyethyl methacrylate) (PHEMA)

Poly(2-hydroxyethyl methacrylate) (PHEMA) and PHEMA-based materials have been of great interest and importance since their disclosure in 1960 (Wichterle, O.; Lim, D. *Nature* 1960, 185, 117). PHEMA-based hydrogels have been widely researched and used in biomedical applications because of their non-toxicity, non-antigenic properties, and biocompatibility (Folkman, J.; Moscona, A. *Nature* 1978, 273, 345). Since the ground-breaking demonstration of polymeric materials for sustained-release purposes, PHEMA and PHEMA-based materials have been investigated and used as carriers for controlled release of water-soluble drugs (Hsiue, G. H.; Guu, J. A.; Cheng, C. C. *Biomaterials* 2001, 22, 1763; Ferreira, L.; Vidal, M. M.; Gil, M. H. *Int. J. Pharm.* 2000, 194, 169; Blanco, M. D.; Trigo, R. M.; Garcia, O.; Teijon, J. M. *J. Biomater. Sci.-Polym. Ed.* 1997, 8, 709; Blanco, M. D.; Garcia, O.; Gomez, C.; Sastre, R. L.; Teijon, J. M. *J. Pharm. Pharmacol.* 2000, 52, 1319; Trigo, R. M.; Blanco, M. D.; Teijon, J. M.; Sastre, R. *Biomaterials* 1994, 15, 1181; Brazel, C. S.; Peppas, N. A. *STP Pharma Sci.* 1999, 9, 473; Garcia, O.; Blanco, M. D.; Gomez, C.; Teijon, J. M. *Polym. Bull.* 1997, 38, 55; Garcia, O.; Trigo, R. M.; Blanco, M. D.; Teijon, J. M. *Biomaterials* 1994, 15, 689; and Lehr, C. M.; Bouwstra, J. A.; Vanhal, D. A.; Verhoef, J. C.; Junginger, H. E. *Eur. J. Pharm. Biopharm.* 1992, 38, 55). A number of these drug-delivery studies involved the use of PHEMA and PHEMA-based thin films. PHEMA and PHEMA-based surfaces have been used for cell adhesion, cell growth, protein adsorption, separation devices, biosensors, and metal-ion adsorption (Harkes, G.; Feijen, J.; Dankert, J. *Biomaterials* 1991, 12, 853; Guan, J. J.; Gao, G. Y.; Feng, L. X.; Sheng, J. C. *J. Biomater. Sci.*-Polym. Ed. 2000, 11, 523; Lopez, G. P.; Ratner, B. D.; Rapoza, R. J.; Horbett, T. A. *Macromolecules* 1993, 26, 3247; Morra, M.; Cassinelli, C. *J. Biomed. Mater. Res.* 1995, 29, 39; Denizli, A.; Say, R.; Patir, S.; Arica, M. Y. *React. Funct. Polym.* 2000, 43, 17; Ibrahim, E. H.; Denizli, A.; Bektas, S.; Genc, O.; Piskin, E. *J. Chromatogr. B* 1998, 720, 217; Arica, M. Y.; Senel, S.; Alaeddinoglu, N. G.; Patir, S.; Denizli, A. *J. Appl. Polym. Sci.* 2000, 75, 1685; and Osada, Y.; Iriyama, Y. *Thin Solid Films* 1984, 118, 197). For micropatterning, PHEMA thin films have been demonstrated as deep-UV and e-beam resists that are developable in aqueous solutions (Vasilopoulou, M.; Boyatzis, S.; Raptis, I.; Dimotikalli, D.; Argitis, P. *J. Mater. Chem.* 2004, 14, 3312). Methacrylic polymers are also known to decompose thermally into small molecules, so thin-films of these materials may be used as sacrificial layers for microstructure fabrication for micro-electronic and optical applications (Zaikov, G. E.; Aseeva, R. M. 1993, 74, 21; Chandra, R.; Saini, R. *J. Macromol. Sci.-Rev. Macromol. Chem. Phys.* 1990, C30, 155; Zulfiqar, S.; Akhtar, N.; Zulfiqar, M.; McNeill, I. C. *Polym. Degrad. Stabil.* 1989, 23, 299; Zulfiqar, S.; Piracha, A.; Masud, K. *Polym. Degrad. Stabil.* 1996, 52, 89; Zulfiqar, S.; Zulfiqar, M.; Nawaz, M.; McNeill, I. C.; Gorman, J. G. *Polym. Degrad. Stabil.* 1990, 30, 195).

Although PHEMA is not sufficiently hydrophilic to dissolve in water, crosslinking of the polymer is normally required to control its gel properties. For instance, the degree of crosslinking has been found to have a significant impact on the rate of drug release from PHEMA-based hydrogels. The degree of swelling has been found to decrease and the mechanical properties have been found to increase with increasing crosslink density (Lee, J. W.; Kim, E. H.; Jhon, M. S. *Bull. Korean Chem. Soc.* 1983, 4, 162; Perera, D. I.; Shanks, R. A. *Polym. Int.* 1995, 37, 133). The ability to produce thin-films of well-defined crosslink densities is therefore crucial.

Thin films of PHEMA and PHEMA-based materials are normally prepared by solution-phase grafting, casting from polymer solution, or confined solution-phase polymerization, all of which are wet processes (Zubaidi; Hirotsu, T. *J. Appl. Polym. Sci.* 1996, 61, 1579; Feng, M.; Morales, A. B.; Beugeling, T.; Bantjes, A.; vanderWerf, K.; Gosselink, G.; deGrooth, B.; Greve, J. *J. Colloid Interface Sci.* 1996, 177, 364; and Chilkoti, A.; Lopez, G. P.; Ratner, B. D.; Hearn, M. J.; Briggs, D. 1993, 26, 4825). Solution-phase grafting is a two-step process involving the creation of radicals on the surface followed by graft polymerization and requires a graftable surface. Casting requires that the polymer be soluble in a solvent, so post-treatment is necessary to create crosslinks. Confined solution-phase polymerization is able to create a crosslinked polymer thin film in one polymerization step, but the technique requires a number of solution preparation steps and subsequent confinement of the solution to produce a thin film. Although this technique allows films of different crosslink densities to be made by preparing solutions of different compositions, it is time-consuming and has poor thickness control.

In contrast to these wet techniques, an all-dry process might be used to produce thin-film coatings on materials that would otherwise dissolve in solvents used in wet processes (e.g., drug particles). A dry process would also offer environmental benefits by mitigating the use of solvents (e.g., N,N-dimethylformamide) and avoiding potential retention of solvents in the films. The release of drugs from hydrogels typically involves gel formation in the presence of dissolved drugs in the polymerization solution or post-polymerization swelling of the gel to incorporate drugs within it. An all-dry process would allow coating of pre-manufactured drug particles for controlled release. Such a coating would act as a membrane that swells in water, and the diffusional transport of drugs would depend on the thickness and the crosslink density.

SUMMARY OF THE INVENTION

One aspect of the present invention relates to the use of initiated CVD (iCVD) to produce thin films of hydrogels (e.g., linear PHEMA homopolymers and crosslinked PHEMA copolymers) on a variety of surfaces. In one embodiment of the invention, iCVD is used to form linear thin films using a radical initiator and an alkene. In another embodiment, iCVD is used to form crosslinked thin films by the addition of a crosslinking agent (e.g., a diacrylate or a dimethyacrylate). The incorporation of a crosslinking agent into the thin films is shown to increase systematically with its partial pressure. In one embodiment, when the crosslinker is EDGA and the monomer is HEMA it results in crosslinked P(HEMA-co-EGDA) copolymer. In another embodiment, when the crosslinker is EDGA and the monomer is VP it results in crosslinked P(VP-co-EGDA). Disclosed are the effects of crosslinker incorporation on the thermal and wetting properties of the polymers. The unique swelling properties of these films are also disclosed, establishing that certain inventive films function as hydrogels when soaked in water.

BRIEF DESCRIPTION OF THE FIGURES

FIG. 1a and FIG. 1b depict selected precursor species of the invention: 2-hydroxyethyl methacrylate (HEMA) and 1-vinyl-2-pyrrolidone (VP) are examples of monomers, ethylene glycol diacrylate (EGDA) is an example of a crosslinking agent, and tert-butyl peroxide (TBPO) is an example of an initiator.

FIG. 13 presents a tabular comparison of the high resolution XPS C 1s scans of iCVD PVP film and reference from the literature (Beamson, G.; Briggs, D. High Resolution XPS of Organic Polymers: the Scienta ESCA300 Database; Wiley: Chichester, West Sussex, England, 1992).

DETAILED DESCRIPTION OF THE INVENTION

Figure 1A:
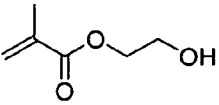
Figure 1A:
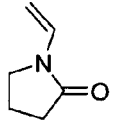
Figure 1A:
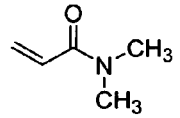
Figure 1A:
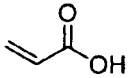
Figure 1A:
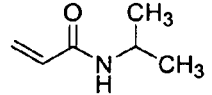
Figure 1A:
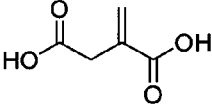
Figure 1A:
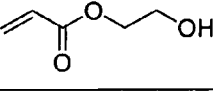
Figure 1A:
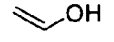
Figure 1A:
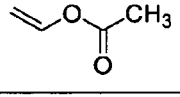
Figure 1A:
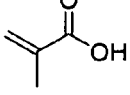
Figure 1A:
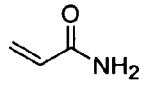

In one embodiment of the present invention, iCVD can be used to deposit linear and crosslinked thin films by feeding a mixture of a monomer, a methacrylate or acrylate crosslinker, and a radical initiator into a vacuum chemical vapor deposition reactor equipped with a resistively-heated filament array and a substrate maintained at or near room temperature (35° C.). iCVD is a one-step, dry technique that may be used to coat materials that would otherwise dissolve in solvents used in wet processes. Remarkably, films with specific crosslink densities, and hence thermal, wetting, and swelling properties, can be synthesized in a single vacuum processing step which simultaneously achieves both polymerization of the monomers and coating of the substrate. Potential applications include coating of materials for sustained-release purposes. iCVD also allows control of crosslink density through control of the partial pressure of the crosslinker in the chemical vapor deposition reactor. This ability not only allows customized films with different crosslink densities to be made with a quick modification of flow rates in the system, but also enables the making of a single graded film with changing crosslink density as a function of film thickness.

The excellent structural retention of the iCVD process is clearly demonstrated by the FTIR and the XPS results described below. Compared to PECVD, iCVD has a much faster typical growth rate (110 vs. 13 nm/min) and at the same time allows control of crosslink density. In addition, the quality of iCVD films is higher because of the lack of UV irradiation and ion bombardment. The fact that the films are hydrophilic and swell in water further supports the conclusion that the hydroxyl groups are retained.

The crosslink densities of iCVD films were assessed using FTIR and XPS, two commonly used characterization methods for thin films. Linear and crosslinked PHEMA iCVD films have excellent thermal stabilities, with onset temperatures of decomposition in the range of 270 to 302° C. They also decompose cleanly during thermal annealing, leaving behind negligible residue when raised to 430° C. under a nitrogen atmosphere. These films may be used as self-decomposing sacrificial materials for fabricating microstructures or even air gaps. More detailed analysis is presented below.

Remarkably, we have demonstrated that control of crosslinking is viable in the vapor-phase iCVD process, as it is in solution-phase polymerization. Thin films of well-defined crosslink densities can be produced in one step by carefully controlling the flow rates of species entering the chemical vapor deposition reactor. This ability can be extended to producing thin films of other types of polymers. One possible application is the enhancement of the mechanical properties of a linear polymer via crosslinking. Further, thin films of other networked hydrophilic polymers can also be made using iCVD. On the other hand, many of the hydrogel systems involve the use of co-monomers, but there is no reason to deny iCVD's ability to produce a crosslinked copolymer. With careful control of partial pressures of species in the chemical vapor deposition reactor, films with well-defined co-monomer ratios and well-defined crosslink densities can be made using iCVD. iCVD should facilitate the production of very thin films of complex polymeric systems that include a number of monomers. Films with specific compositions can be tailored according to their intended applications. The inventions disclosed herein are by no means limited to the area of hydrogels, but can be extended to other categories of copolymers and terpolymers with well-defined compositions and/or crosslink densities.

Definitions

For convenience, certain terms employed in the specification, examples, and appended claims are collected here.

"CVD" as used here is an abbreviation for chemical vapor deposition. "iCVD" as used here is an abbreviation for initiated chemical vapor deposition.

The "last receding angle measurement," hereby referred to as the "ultimate receding angle", is representative of how hydrophilic the surface is after equilibration with water.

The term "copolymer" as used herein means a polymer of two or more different monomers.

The term "heteroatom" is art-recognized and refers to an atom of any element other than carbon or hydrogen. Illustrative heteroatoms include boron, nitrogen, oxygen, phosphorus, sulfur and selenium.

The term "alkyl" is art-recognized, and includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., $C_1$-$C_{30}$ for straight chain, $C_3$-$C_{30}$ for branched chain), and alternatively, about 20 or fewer. Likewise, cycloalkyls have from about 3 to about 10 carbon atoms in their ring structure, and alternatively about 5, 6 or 7 carbons in the ring structure.

Unless the number of carbons is otherwise specified, "lower alkyl" refers to an alkyl group, as defined above, but having from one to about ten carbons, alternatively from one to about six carbon atoms in its backbone structure. Likewise, "lower alkenyl" and "lower alkynyl" have similar chain lengths.

The term "aralkyl" is art-recognized and refers to an alkyl group substituted with an aryl group (e.g., an aromatic or heteroaromatic group).

The terms "alkenyl" and "alkynyl" are art-recognized and refer to unsaturated aliphatic groups analogous in length and possible substitution to the alkyls described above, but that contain at least one double or triple bond respectively.

The term "aryl" is art-recognized and refers to 5-, 6- and 7-membered single-ring aromatic groups that may include from zero to four heteroatoms, for example, benzene, naphthalene, anthracene, pyrene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "aryl heterocycles" or "heteroaromatics." The aromatic ring may be substituted at one or more ring positions with such substituents as described above, for example, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —$CF_3$, —CN, or the like. The term "aryl" also includes polycyclic ring systems having two or more cyclic rings in which two or more carbons are common to two adjoining rings (the rings are "fused rings") wherein at least one of the rings is aromatic, e.g., the other cyclic rings may be cycloalkyls, cycloalkenyls, cycloalkynyls, aryls and/or heterocyclyls.

The terms ortho, meta and para are art-recognized and refer to 1,2-, 1,3- and 1,4-disubstituted benzenes, respectively. For example, the names 1,2-dimethylbenzene and ortho-dimethylbenzene are synonymous.

The terms "heterocyclyl", "heteroaryl", or "heterocyclic group" are art-recognized and refer to 3- to about 10-membered ring structures, alternatively 3- to about 7-membered rings, whose ring structures include one to four heteroatoms. Heterocycles may also be polycycles. Heterocyclyl groups include, for example, thiophene, thianthrene, furan, pyran, isobenzofuran, chromene, xanthene, phenoxanthene, pyrrole, imidazole, pyrazole, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, phenanthridine, acridine, pyrimidine, phenanthroline, phenazine, phenarsazine, phenothiazine, furazan, phenoxazine, pyrrolidine, oxolane, thiolane, oxazole, piperidine, piperazine, morpholine, lactones, lactams such as azetidinones and pyrrolidinones, sultams, sultones, and the like. The heterocyclic ring may be substituted at one or more positions with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The terms "polycyclyl" or "polycyclic group" are art-recognized and refer to two or more rings (e.g., cycloalkyls, cycloalkenyls, cycloalkynyls, aryls and/or heterocyclyls) in which two or more carbons are common to two adjoining rings, e.g., the rings are "fused rings". Rings that are joined through non-adjacent atoms are termed "bridged" rings. Each of the rings of the polycycle may be substituted with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The term "carbocycle" is art-recognized and refers to an aromatic or non-aromatic ring in which each atom of the ring is carbon.

The term "nitro" is art-recognized and refers to —$NO_2$; the term "halogen" is art-recognized and refers to —F, —Cl, —Br or —I; the term "sulfhydryl" is art-recognized and refers to —SH; the term "hydroxyl" means —OH; and the term "sulfonyl" is art-recognized and refers to —$SO_2^-$. "Halide" designates the corresponding anion of the halogens, and "pseudohalide" has the definition set forth on page 560 of "Advanced Inorganic Chemistry" by Cotton and Wilkinson.

The terms "amine" and "amino" are art-recognized and refer to both unsubstituted and substituted amines, e.g., a moiety that may be represented by the general formulas:

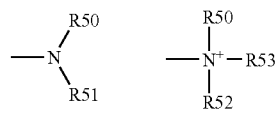

wherein R50, R51, R52 and R53 each independently represent a hydrogen, an alkyl, an alkenyl, —$(CH_2)_m$—R61, or R50 and R51 or R52, taken together with the N atom to which they are attached complete a heterocycle having from 4 to 8 atoms in the ring structure; R61 represents an aryl, a cycloalkyl, a cycloalkenyl, a heterocycle or a polycycle; and m is zero or an integer in the range of 1 to 8. In other embodiments, R50 and R51 (and optionally R52) each independently represent a hydrogen, an alkyl, an alkenyl, or —$(CH_2)_m$—R61. Thus, the term "alkylamine" includes an amine group, as defined above, having a substituted or unsubstituted alkyl attached thereto, i.e., at least one of R50 and R51 is an alkyl group.

The term "acylamino" is art-recognized and refers to a moiety that may be represented by the general formula:

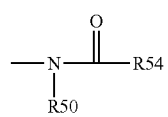

wherein R50 is as defined above, and R54 represents a hydrogen, an alkyl, an alkenyl or —$(CH_2)_m$—R61, where m and R61 are as defined above.

The term "amido" is art recognized as an amino-substituted carbonyl and includes a moiety that may be represented by the general formula:

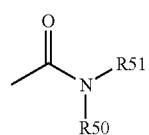

wherein R50 and R51 are as defined above. Certain embodiments of the amide in the present invention will not include imides which may be unstable.

The term "alkylthio" refers to an alkyl group, as defined above, having a sulfur radical attached thereto. In certain embodiments, the "alkylthio" moiety is represented by one of —S-alkyl, —S-alkenyl, —S-alkynyl, and —S—$(CH_2)_m$—R61, wherein m and R61 are defined above. Representative alkylthio groups include methylthio, ethyl thio, and the like.

The term "carboxyl" is art recognized and includes such moieties as may be represented by the general formulas:

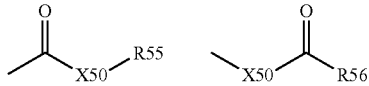

wherein X50 is a bond or represents an oxygen or a sulfur, and R55 and R56 represents a hydrogen, an alkyl, an alkenyl, —(CH$_2$)$_m$—R61 or a pharmaceutically acceptable salt, R56 represents a hydrogen, an alkyl, an alkenyl or —(CH$_2$)$_m$—R61, where m and R61 are defined above. Where X50 is an oxygen and R55 or R56 is not hydrogen, the formula represents an "ester". Where X50 is an oxygen, and R55 is as defined above, the moiety is referred to herein as a carboxyl group, and particularly when R55 is a hydrogen, the formula represents a "carboxylic acid". Where X50 is an oxygen, and R56 is hydrogen, the formula represents a "formate". In general, where the oxygen atom of the above formula is replaced by sulfur, the formula represents a "thiolcarbonyl" group. Where X50 is a sulfur and R55 or R56 is not hydrogen, the formula represents a "thiolester." Where X50 is a sulfur and R55 is hydrogen, the formula represents a "thiolcarboxylic acid." Where X50 is a sulfur and R56 is hydrogen, the formula represents a "thiolformate." On the other hand, where X50 is a bond, and R55 is not hydrogen, the above formula represents a "ketone" group. Where X50 is a bond, and R55 is hydrogen, the above formula represents an "aldehyde" group.

The term "carbamoyl" refers to —O(C=O)NRR', where R and R' are independently H, aliphatic groups, aryl groups or heteroaryl groups.

The term "oxo" refers to a carbonyl oxygen (=O).

The terms "oxime" and "oxime ether" are art-recognized and refer to moieties that may be represented by the general formula:

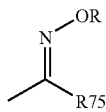

wherein R75 is hydrogen, alkyl, cycloalkyl, alkenyl, alkynyl, aryl, aralkyl, or —(CH$_2$)$_m$—R61. The moiety is an "oxime" when R is H; and it is an "oxime ether" when R is alkyl, cycloalkyl, alkenyl, alkynyl, aryl, aralkyl, or —(CH$_2$)$_m$—R61.

The terms "alkoxyl" or "alkoxy" are art-recognized and refer to an alkyl group, as defined above, having an oxygen radical attached thereto. Representative alkoxyl groups include methoxy, ethoxy, propyloxy, tert-butoxy and the like. An "ether" is two hydrocarbons covalently linked by an oxygen. Accordingly, the substituent of an alkyl that renders that alkyl an ether is or resembles an alkoxyl, such as may be represented by one of —O-alkyl, —O-alkenyl, —O-alkynyl, —O—(CH$_2$)$_m$—R61, where m and R61 are described above.

The term "sulfonate" is art recognized and refers to a moiety that may be represented by the general formula:

in which R57 is an electron pair, hydrogen, alkyl, cycloalkyl, or aryl.

The term "sulfate" is art recognized and includes a moiety that may be represented by the general formula:

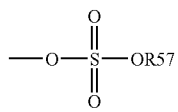

in which R57 is as defined above.

The term "sulfonamido" is art recognized and includes a moiety that may be represented by the general formula:

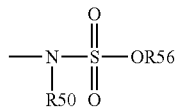

in which R50 and R56 are as defined above.

The term "sulfamoyl" is art-recognized and refers to a moiety that may be represented by the general formula:

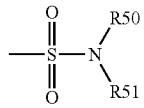

in which R50 and R51 are as defined above.

The term "sulfonyl" is art-recognized and refers to a moiety that may be represented by the general formula:

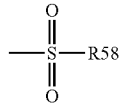

in which R58 is one of the following: hydrogen, alkyl, alkenyl, alkynyl, cycloalkyl, heterocyclyl, aryl or heteroaryl.

The term "sulfoxido" is art-recognized and refers to a moiety that may be represented by the general formula:

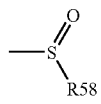

in which R58 is defined above.

The term "phosphoryl" is art-recognized and may in general be represented by the formula:

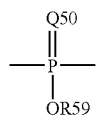

wherein Q50 represents S or O, and R59 represents hydrogen, a lower alkyl or an aryl. When used to substitute, e.g., an alkyl, the phosphoryl group of the phosphorylalkyl may be represented by the general formulas:

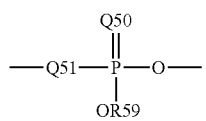 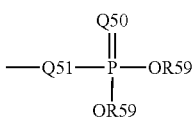

wherein Q50 and R59, each independently, are defined above, and Q51 represents O, S or N. When Q50 is S, the phosphoryl moiety is a "phosphorothioate".

The term "phosphoramidite" is art-recognized and may be represented in the general formulas:

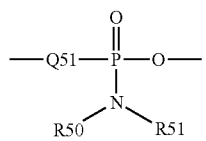 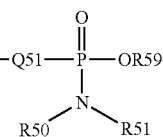

wherein Q51, R50, R51 and R59 are as defined above.

The term "phosphonamidite" is art-recognized and may be represented in the general formulas:

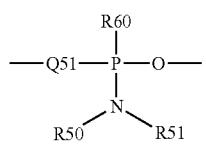 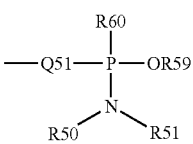

wherein Q51, R50, R51 and R59 are as defined above, and R60 represents a lower alkyl or an aryl.

Analogous substitutions may be made to alkenyl and alkynyl groups to produce, for example, aminoalkenyls, aminoalkynyls, amidoalkenyls, amidoalkynyls, iminoalkenyls, iminoalkynyls, thioalkenyls, thioalkynyls, carbonyl-substituted alkenyls or alkynyls.

The definition of each expression, e.g., alkyl, m, n, and the like, when it occurs more than once in any structure, is intended to be independent of its definition elsewhere in the same structure.

The term "selenoalkyl" is art-recognized and refers to an alkyl group having a substituted seleno group attached thereto. Exemplary "selenoethers" which may be substituted on the alkyl are selected from one of —Se-alkyl, —Se-alkenyl, —Se-alkynyl, and —Se—$(CH_2)_m$—R61, m and R61 being defined above.

The abbreviations Me, Et, Ph, Tf, Nf, Ts, and Ms represent methyl, ethyl, phenyl, trifluoromethanesulfonyl, nonafluorobutanesulfonyl, p-toluenesulfonyl and methanesulfonyl, respectively. A more comprehensive list of the abbreviations utilized by organic chemists of ordinary skill in the art appears in the first issue of each volume of the Journal of Organic Chemistry; this list is typically presented in a table entitled Standard List of Abbreviations.

It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, or other reaction.

The term "substituted" is also contemplated to include all permissible substituents of organic compounds. In a broad aspect, the permissible substituents include acyclic and cyclic, branched and unbranched, carbocyclic and heterocyclic, aromatic and nonaromatic substituents of organic compounds. Illustrative substituents include, for example, those described herein above. The permissible substituents may be one or more and the same or different for appropriate organic compounds. For purposes of this invention, the heteroatoms such as nitrogen may have hydrogen substituents and/or any permissible substituents of organic compounds described herein which satisfy the valences of the heteroatoms. This invention is not intended to be limited in any manner by the permissible substituents of organic compounds.

As used here "-alkyl" refers to a radical such as —$CH_2CH_3$, while "-alkyl-" refers to a diradical such as —$CH_2CH_2$—.

For purposes of this invention, the chemical elements are identified in accordance with the Periodic Table of the Elements, CAS version, "Handbook of Chemistry and Physics", 67th Ed., 1986-87, inside cover.

The phrase "polydispersity index" refers to the ratio of the "weight average molecular weight" to the "number average molecular weight" for a particular polymer; it reflects the distribution of individual molecular weights in a polymer sample.

The phrase "weight average molecular weight" refers to a particular measure of the molecular weight of a polymer. The weight average molecular weight is calculated as follows: determine the molecular weight of a number of polymer molecules; add the squares of these weights; and then divide by the total weight of the molecules.

The phrase "number average molecular weight" refers to a particular measure of the molecular weight of a polymer. The number average molecular weight is the common average of the molecular weights of the individual polymer molecules. It is determined by measuring the molecular weight of n polymer molecules, summing the weights, and dividing by n.

Chemical Vapor Deposition (CVD)

Figure 11:
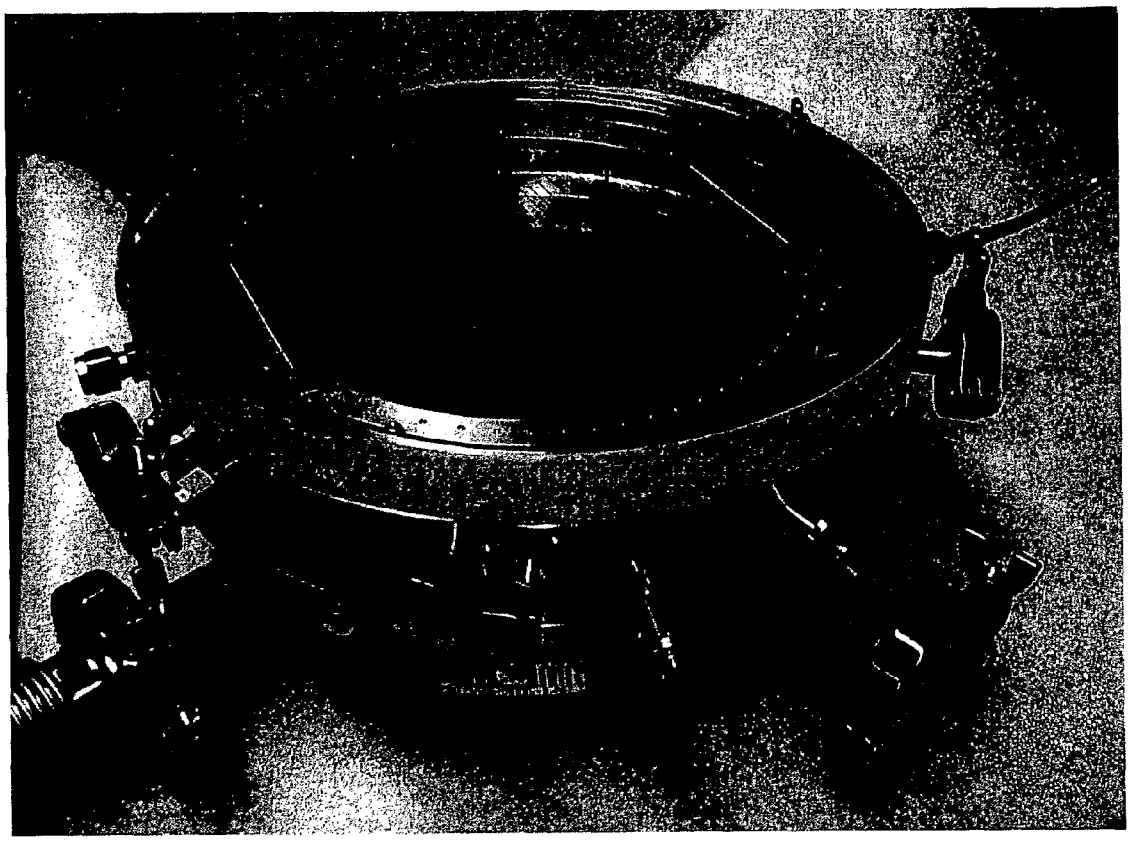
FIG. 11 depicts an example of an iCVD reactor.
Figure 12:
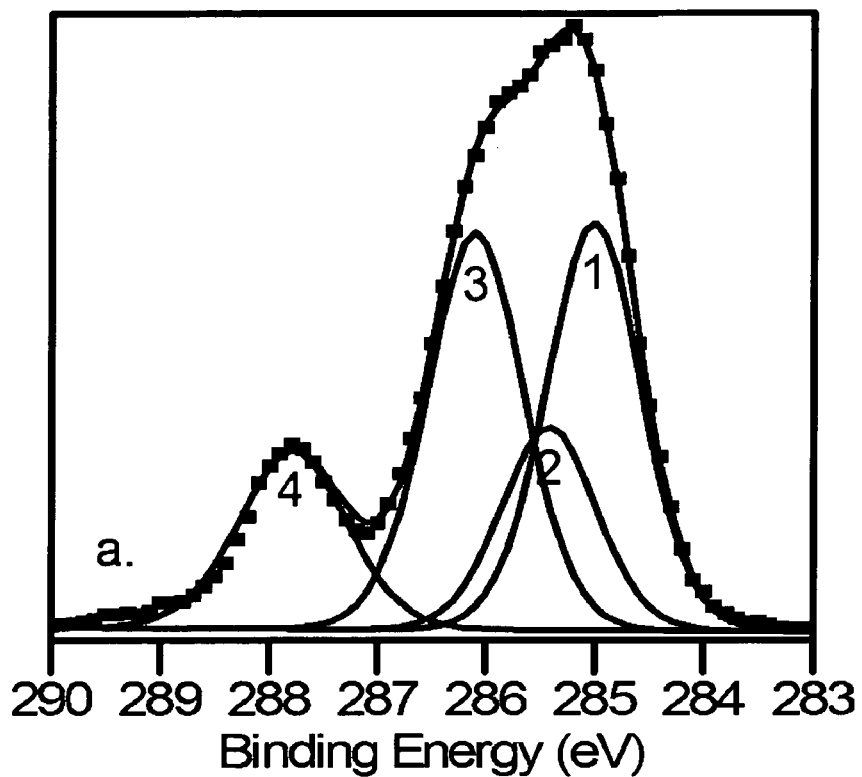
FIG. 12 depicts high-resolution X-ray photoelectron spectroscopy (XPS) C 1s scans of (a) iCVD PVP film and (b) Aldrich PVP standard.
Figure 12:
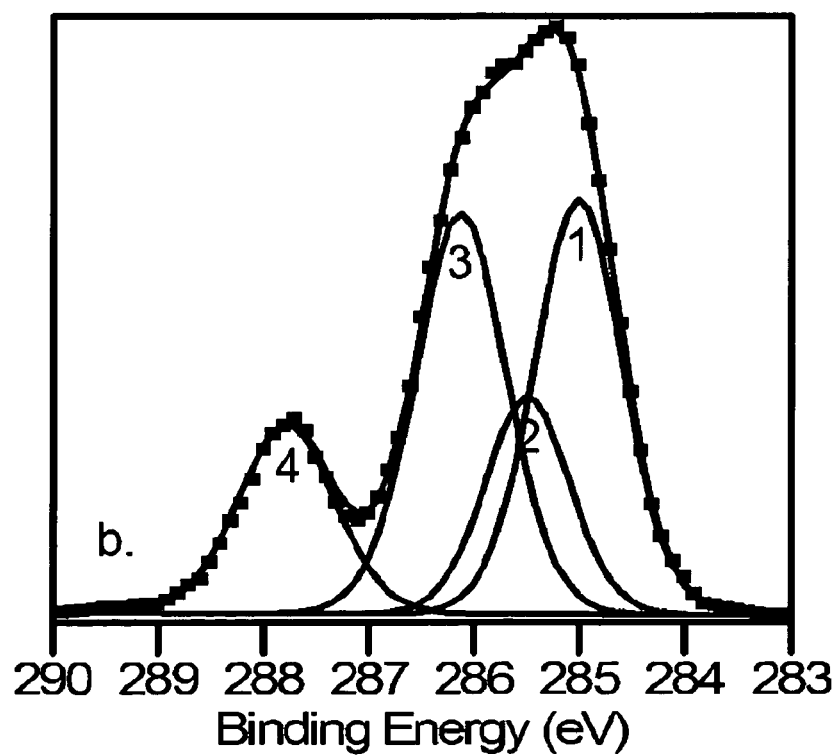
Figure 14:
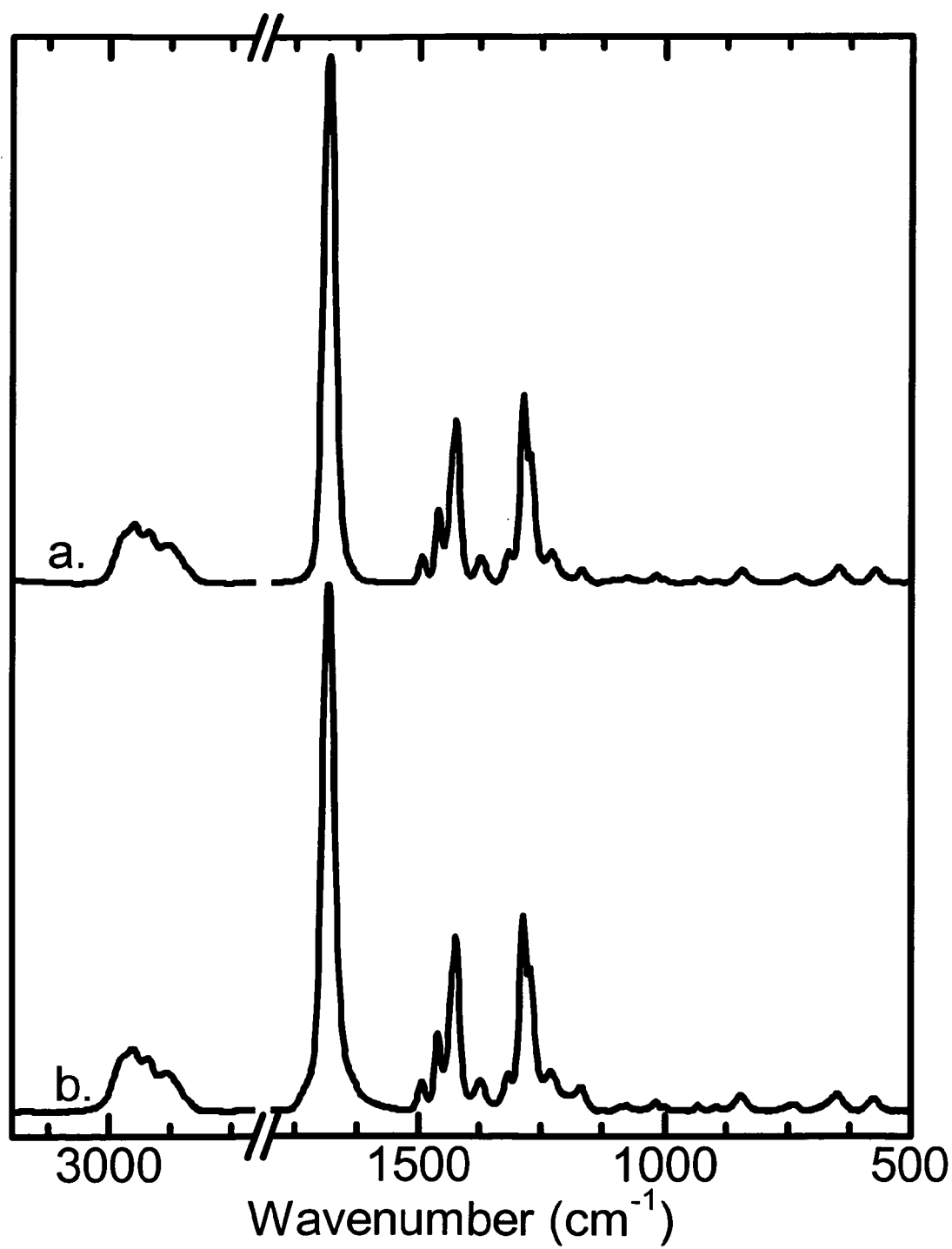
FIG. 14 depicts Fourier-transform infrared spectra of (a) iCVD PVP film and (b) Aldrich PVP standard.
Figure 15:
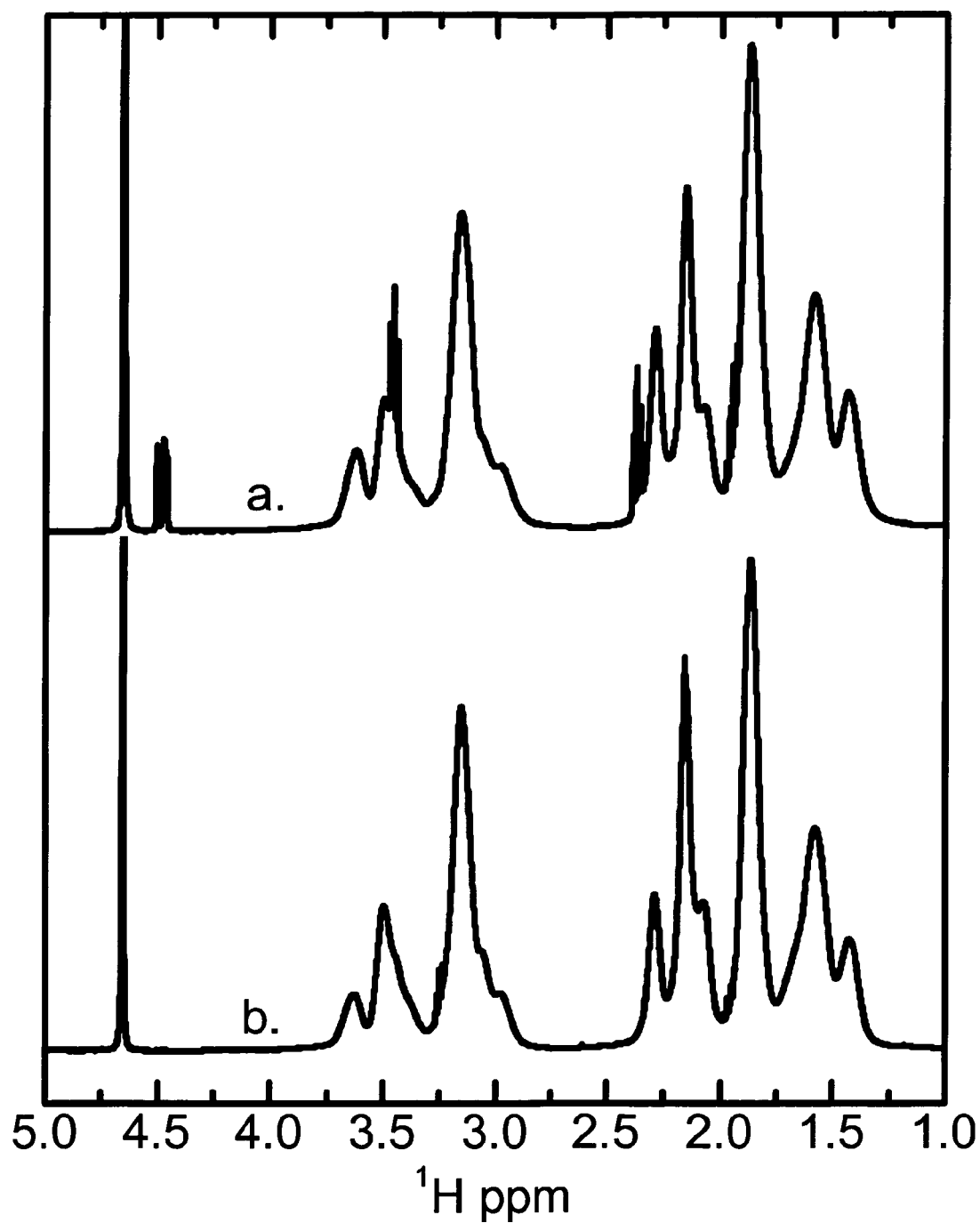
FIG. 15 depicts a solution-phase proton nuclear magnetic resonance spectra of (a) iCVD PVP film and (b) Aldrich PVP standard dissolved in deuterium oxide. The peak at ~4.7 ppm is the proton peak from water in the solvent.
Figure 16:
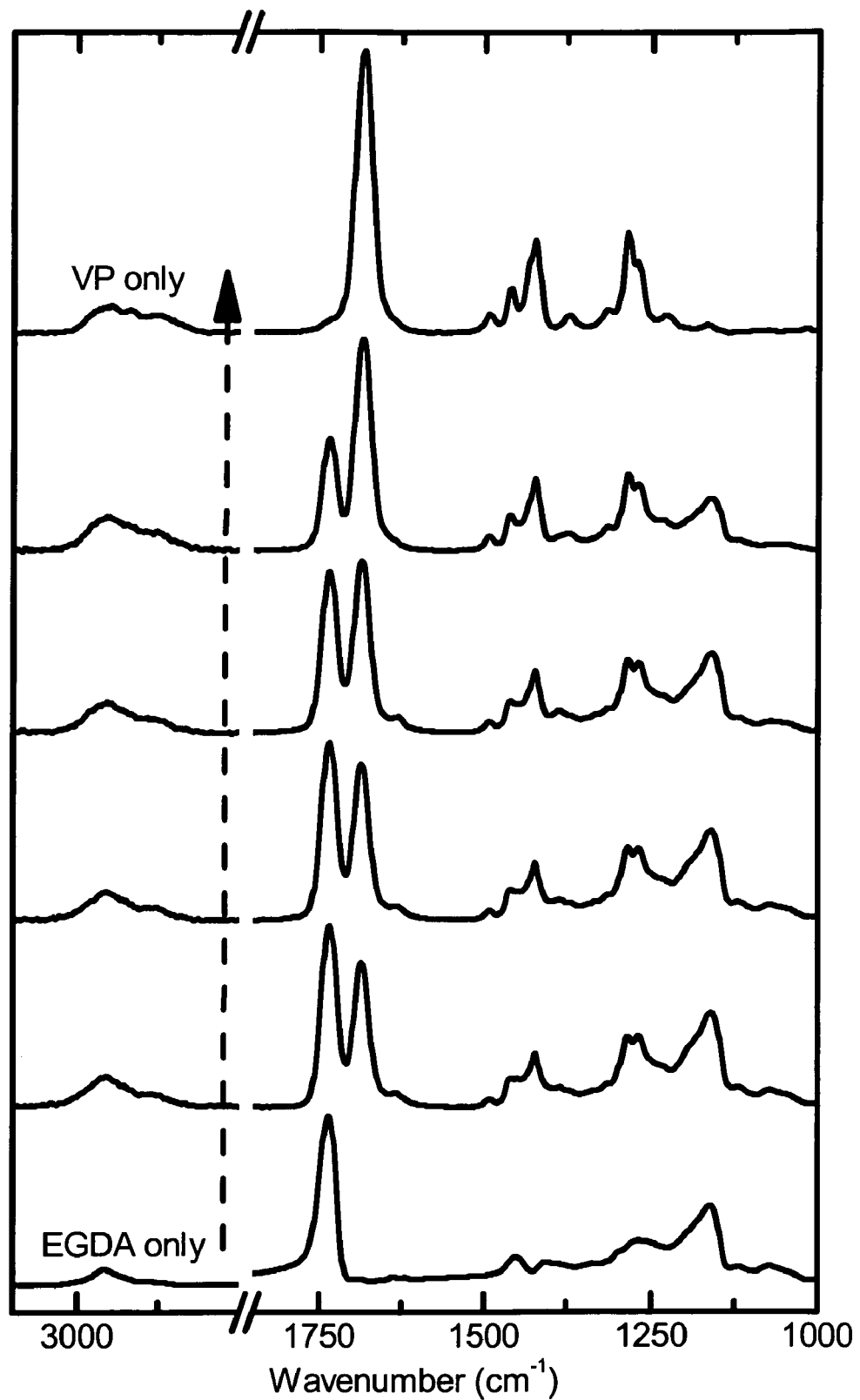
FIG. 16 depicts a series of FTIR spectra showing variation in EGDA content through flow-rate manipulation.
Figure 17:
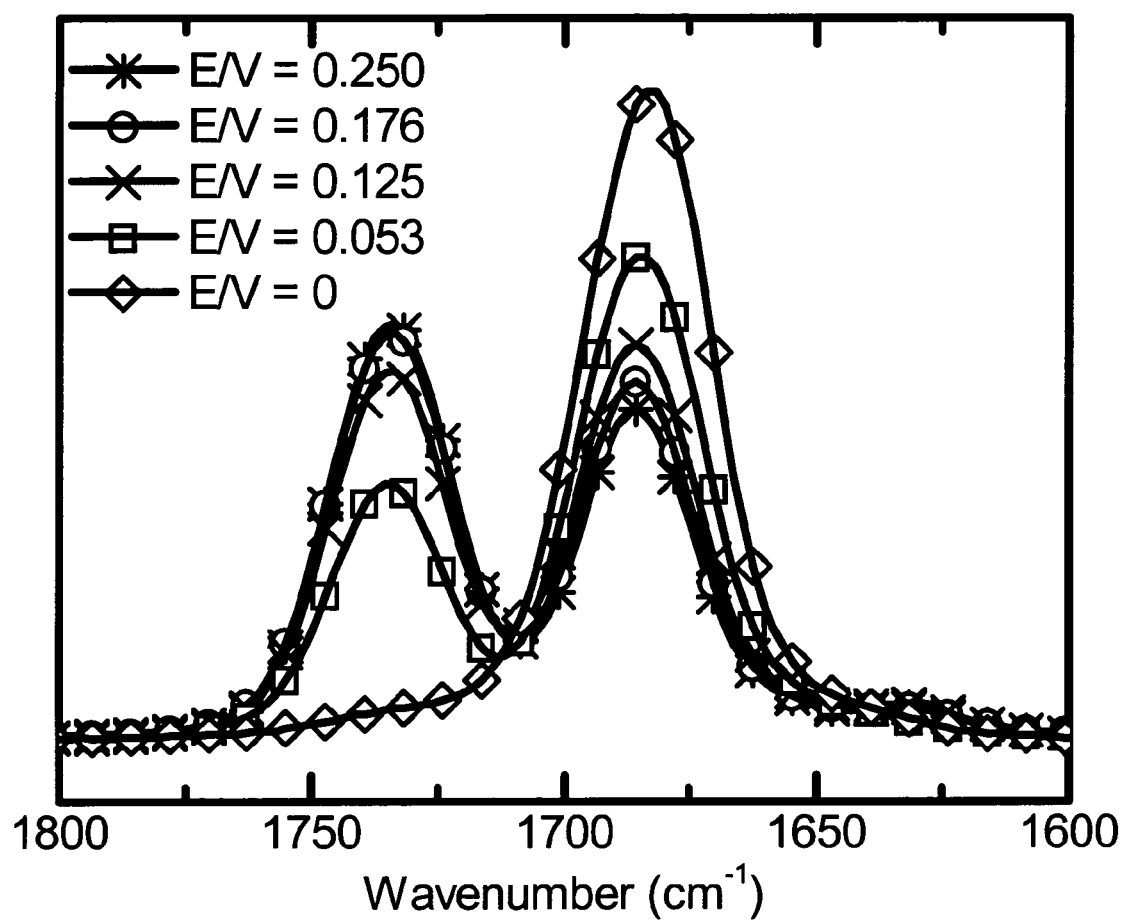
FIG. 17 depicts FTIR spectra in the carbonyl-stretching region detailing the relative intensities between the EGDA C=O and the VP C=O peaks.
Figure 18:
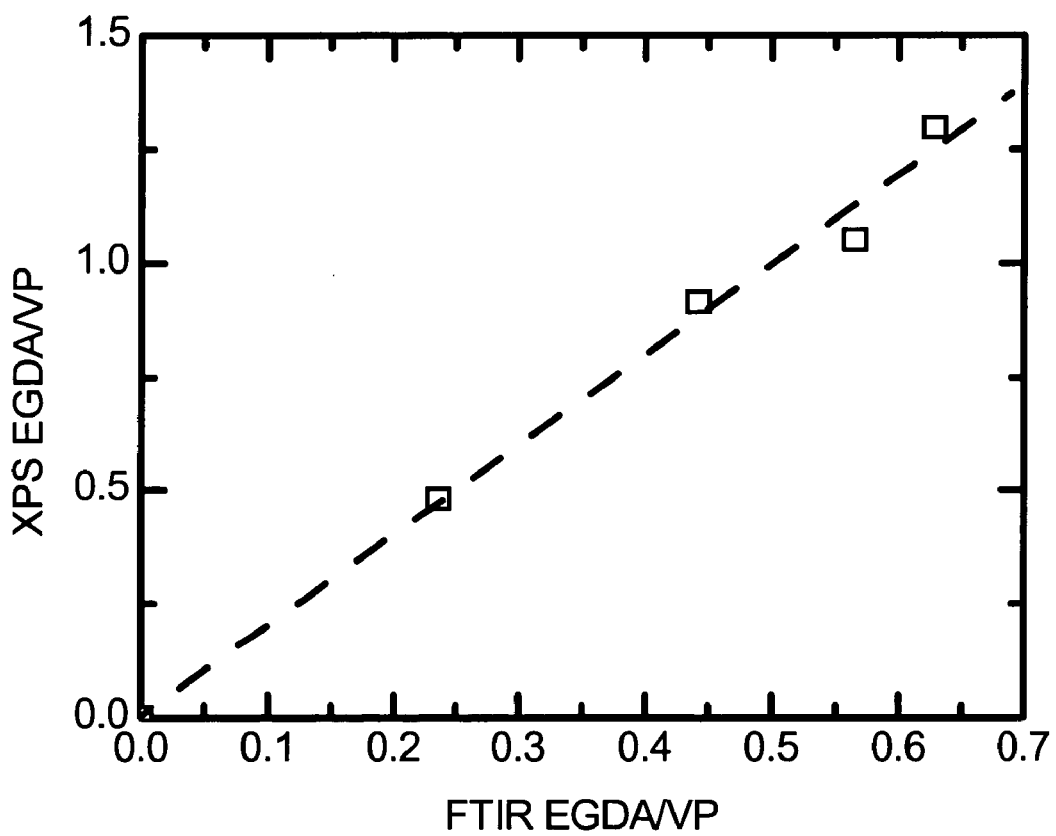
FIG. 18 depicts a plot of EGDA/VP intensity ratio of XPS against that of FTIR. Results indicate that the carbonyl bond oscillator strength of VP is approximately twice of that of EGDA.
Figure 19:
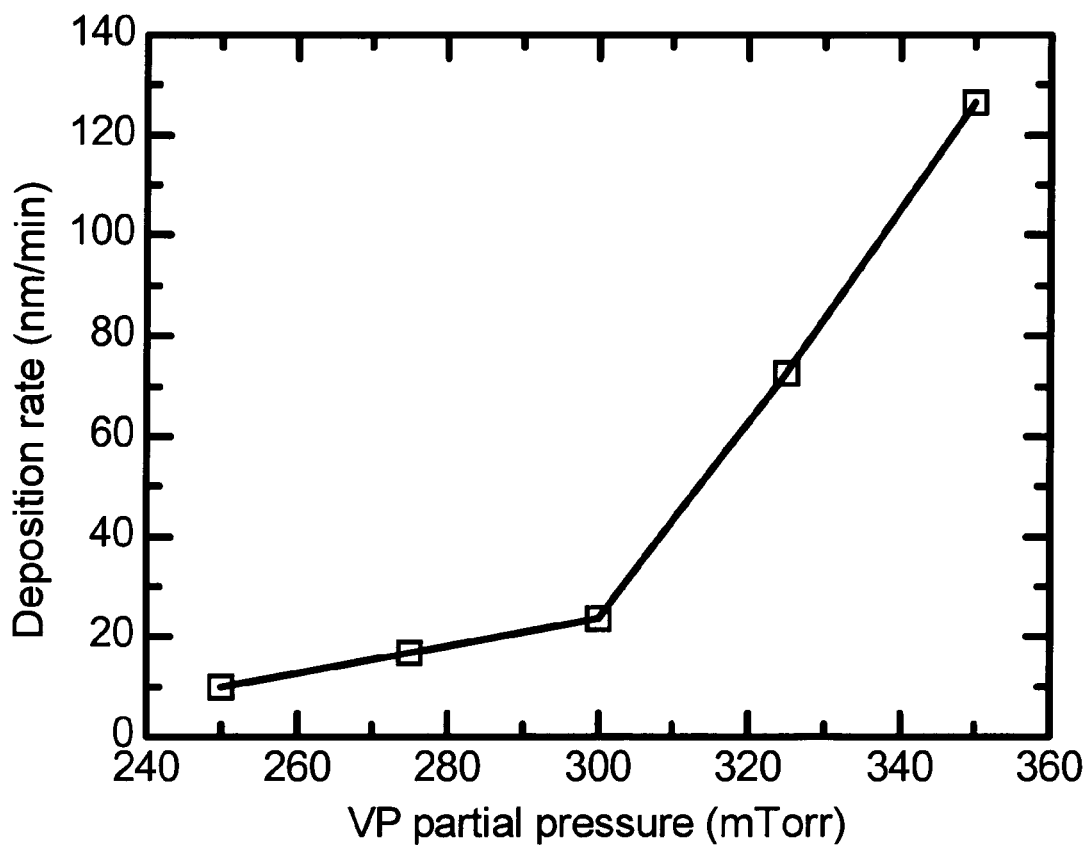
FIG. 19 depicts deposition rate as a function of VP partial pressure. The maximum growth rate depicted is 127 nm/min. At this rate, growth of a 1-μm film would take less than 8 min.
Figure 20:
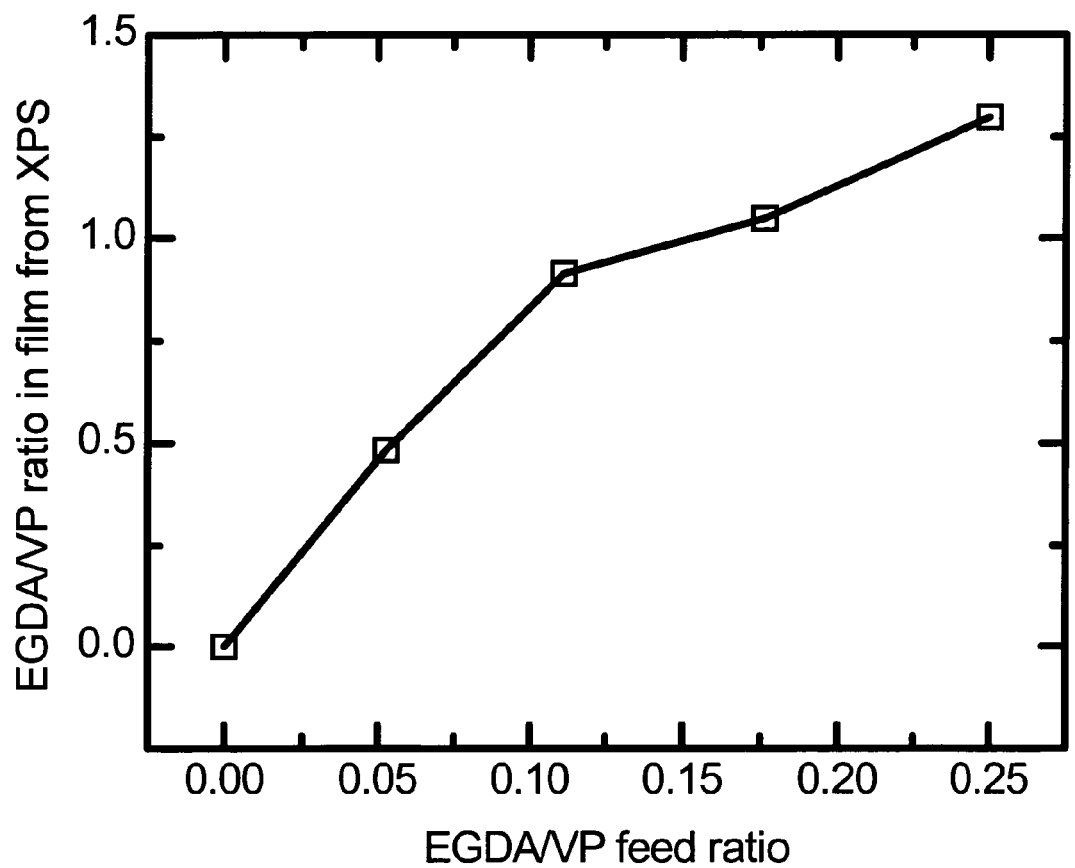
FIG. 20 depicts EGDA/VP ratio in film from XPS as a function of EGDA/VP feed ratio.
Figure 21:
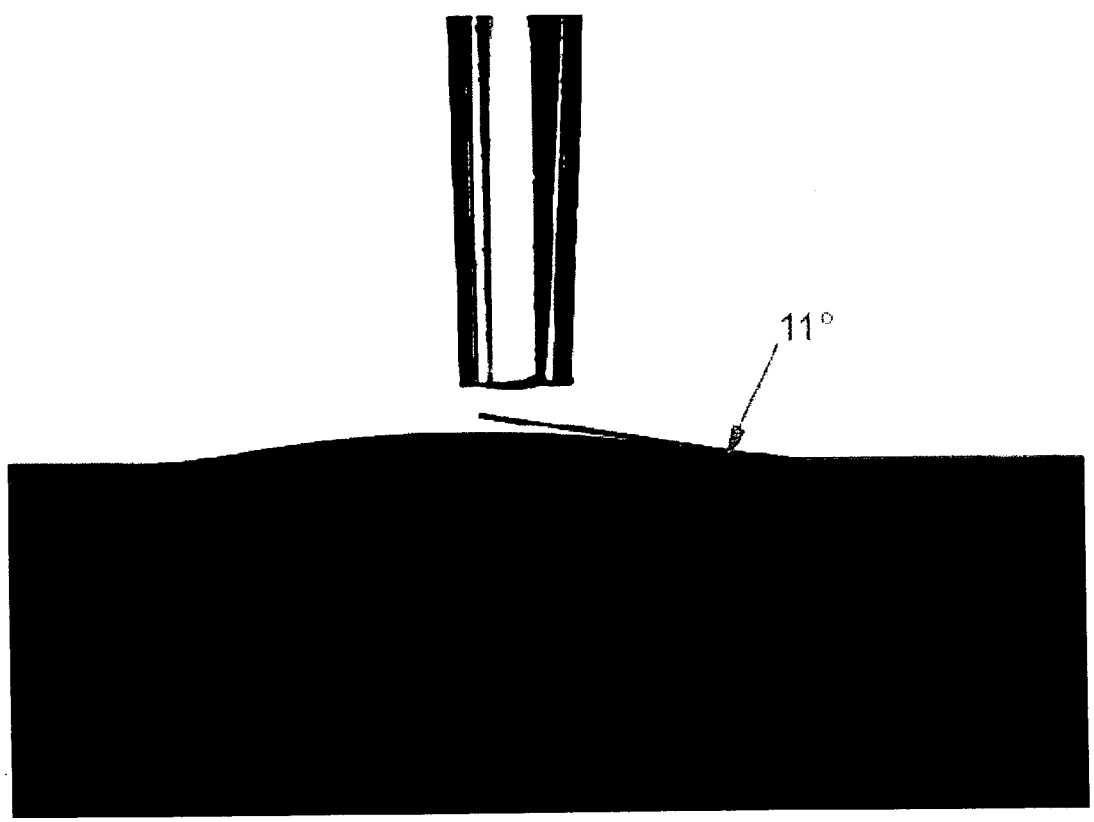
FIG. 21 is a image of a water droplet on Sample X7 at the end of an advancing/receding cycle.

CVD generally takes place in a reactor (see, e.g., FIG. 11). The surface to be coated is placed on a stage in the reactor and gaseous precursor molecules are fed into the reactor; said stage may simply be the bottom of the reactor and not a separate entity. CVD provides a uniform or substantially uniform coating on rough, fibrous, and porous morphologies with high surface areas. The CVD coating process is compatible with a variety of organic and inorganic materials since it does not depend on evenly wetting the substrate surface. The CVD technique disclosed herein eliminates wet processing steps that can damage some electronic devices and organic membranes through wetting or the spin-coating process often used to apply solution-based films.

In addition, films produced by iCVD have a better-defined chemical structure than films made by traditional "wet" processing because there are fewer reaction pathways in the iCVD methods. Therefore, iCVD provides films with a substantially lower density of dangling bonds, i.e., unpaired electrons. If such bonds are present, the film will undergo reactions with components of the ambient atmosphere (such as water, resulting in a large number of hydroxyl groups). Therefore, non-iCVD films are more susceptible to atmospheric ageing, and degradation of their optical, electrical and chemical properties.

The iCVD coating process can take place at a range of pressures from atmospheric pressure to low vacuum. In certain embodiments, the pressure is less than about 500 mtorr; in yet other embodiments the pressure is less than about 400 mtorr or less than about 300 mtorr.

The iCVD coating process can take place at a range of temperatures. In certain embodiments the temperature is ambient temperature. In certain embodiments the temperature is about 25° C.; in yet other embodiments the temperature is between about 25° C. and 100° C., or between about 0° C. and 25° C.

Methods of the Invention

One aspect of the invention relates to a method of forming a polymer coating on a surface of an article, comprising the steps of:

placing said article on a stage in a chemical vapor deposition reactor; wherein said stage is optionally maintained at about a first temperature;

mixing together a gaseous monomer at a first partial pressure, a gaseous initiator at a second partial pressure and, optionally, a gaseous crosslinker at a third partial pressure, thereby forming a reactive mixture; and contacting said surface of said article with said reactive mixture;

wherein said gaseous initiator is selected from the group consisting of peroxides, hydroperoxides, and diazines; said gaseous monomer is a compound of formula I, II or III; and said gaseous crosslinker is a compound of formula IV:

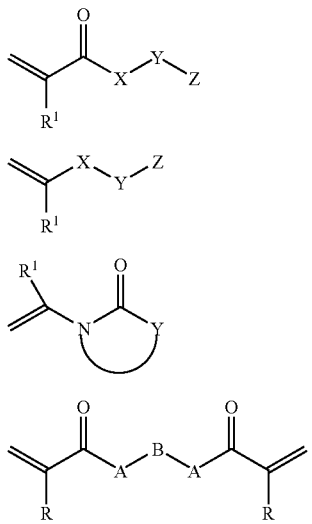

wherein, independently for each occurrence,

X is —$C(R^2)_2$—, —O—, —S— or —$N(R^2)$—;
A is —$C(R^2)_2$—, —O—, —S— or —$N(R^2)$—
Y is —$(C(R^2)_2)_n$—;
B is —$(C(R^2)_2)_m$—;
Z is $R^2$, $OR^2$, $SR^2$, $N(R^2)_2$ or —$C(=O)R^2$;
R is —H, —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)_2$, or —$C(CH)_3$;
$R^1$ is —H, —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)_2$, —$C(CH)_3$, —$CH_2COOH$, —$CH_2CH_2COOH$ or —$CH_2CH_2CH_2COOH$;
$R^2$ is —H, —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)_2$, —$C(CH)_3$, cycloalkyl, aryl or aralkyl;
n is 0 to 6 inclusive; and
m is 1 to 6 inclusive.

Another aspect of the invention relates to a method of forming a polymer coating on a surface of an article, comprising the steps of:

placing said article on a stage in a chemical vapor deposition reactor; wherein said stage is optionally maintained at about a first temperature;

mixing together a gaseous monomer at a first partial pressure, a gaseous initiator at a second partial pressure and, optionally, a gaseous crosslinker at a third partial pressure, thereby forming a reactive mixture; and contacting said surface of said article with said reactive mixture;

wherein said gaseous initiator is selected from the group consisting of peroxides, hydroperoxides, and diazines; said gaseous monomer is a compound of formula I; and said gaseous crosslinker is a compound of formula IV:

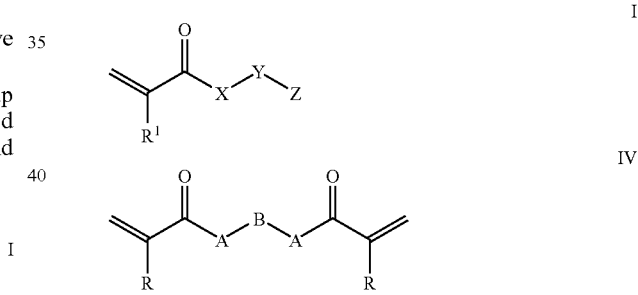

wherein, independently for each occurrence,

X is —$C(R^2)_2$—, —O—, —S— or —$N(R^2)$—;
A is —O—, —S— or —$N(R^2)$—;
Y is —$(C(R^2)_2)_n$—;
B is —$(C(R^2)_2)_m$—;
Z is $R^2$, $OR^2$, $SR^2$, or $N(R^2)_2$;
R is —H, —$CH_3$, —$CH_2CH_3$, —$CH_2CH_2CH_3$, —$CH(CH_3)_2$, —$CH_2CH_2CH_2CH_3$, —$CH(CH_3)CH_2CH_3$, —$CH_2CH(CH_3)_2$, or —$C(CH)_3$;
$R^1$ is —H, —$CH_3$, —$CH_2CH_3$, —$CH_2CH_2CH_3$, —$CH(CH_3)_2$, —$C(CH)_3$, —$CH_2CH_2CH_2CH_3$, —$CH(CH_3)CH_2CH_3$, or —$CH_2CH(CH_3)_2$;
$R^2$ is —H, —$CH_3$, —$CH_2CH_3$, —$CH_2CH_2CH_3$, —$CH(CH_3)_2$, —$C(CH)_3$, —$CH_2CH_2CH_2CH_3$, —$CH(CH_3)CH_2CH_3$, —$CH_2CH(CH_3)_2$, cycloalkyl, aryl or aralkyl;
n is 0 to 6 inclusive; and
m is 1 to 6 inclusive.

In certain embodiments, the present invention relates to the aforementioned method, wherein $R^1$ is —H or —$CH_3$.

In certain embodiments, the present invention relates to the aforementioned method, wherein $R^1$ is —H.

In certain embodiments, the present invention relates to the aforementioned method, wherein $R^1$ is —$CH_3$.

In certain embodiments, the present invention relates to the aforementioned method, wherein R is —H or —$CH_3$.

In certain embodiments, the present invention relates to the aforementioned method, wherein R is —H.

In certain embodiments, the present invention relates to the aforementioned method, wherein R is —$CH_3$.

In certain embodiments, the present invention relates to the aforementioned method, wherein X is —O— or —NH—.

In certain embodiments, the present invention relates to the aforementioned method, wherein X is —O—.

In certain embodiments, the present invention relates to the aforementioned method, wherein X is —NH—.

In certain embodiments, the present invention relates to the aforementioned method, wherein A is —O— or —NH—.

In certain embodiments, the present invention relates to the aforementioned method, wherein A is —O—.

In certain embodiments, the present invention relates to the aforementioned method, wherein A is —NH—.

In certain embodiments, the present invention relates to the aforementioned method, wherein Y is —$CH_2$—, —$CH_2CH_2$—, —$CH_2CH_2CH_2$— or —$CH_2CH_2CH_2CH_2$—.

In certain embodiments, the present invention relates to the aforementioned method, wherein Y is —$CH_2$— or —$CH_2CH_2$—.

In certain embodiments, the present invention relates to the aforementioned method, wherein B is —$CH_2$—, —$CH_2CH_2$—, —$CH_2CH_2CH_2$— or —$CH_2CH_2CH_2CH_2$—.

In certain embodiments, the present invention relates to the aforementioned method, wherein B is —$CH_2$— or —$CH_2CH_2$—.

In certain embodiments, the present invention relates to the aforementioned method, wherein Z is OH, NH($R^2$) or N($R^2$)$_2$.

In certain embodiments, the present invention relates to the aforementioned method, wherein Z is OH.

In certain embodiments, the present invention relates to the aforementioned method, wherein Z is NH($R^2$).

In certain embodiments, the present invention relates to the aforementioned method, wherein Z is N($R^2$)$_2$.

In certain embodiments, the present invention relates to the aforementioned method, wherein X is —O— or —N($R^2$)—; Y is —($CH_2$)$_n$—; Z is —OH; n is 1, 2, 3 or 4; and $R^1$ is —H or —$CH_3$.

In certain embodiments, the present invention relates to the aforementioned method, wherein X is —O—; Y is —($CH_2$)$_n$—; Z is —OH; n is 1, 2, 3 or 4; and $R^1$ is —H or —$CH_3$.

In certain embodiments, the present invention relates to the aforementioned method, wherein X is —N($R^2$)—; Y is —($CH_2$)$_n$—; Z is —OH; n is 1, 2, 3 or 4; and $R^1$ is —H or —$CH_3$.

In certain embodiments, the present invention relates to the aforementioned method, wherein X is —O—; Y is —($CH_2$)$_n$—; Z is —OH; n is 2; and $R^1$ is —H.

In certain embodiments, the present invention relates to the aforementioned method, wherein X is —O—; Y is —($CH_2$)$_n$—; Z is —OH; n is 2; and $R^1$ is —$CH_3$.

In certain embodiments, the present invention relates to the aforementioned method, wherein X is —O— or —N($R^2$); Z is —OH; n is 0; and $R^1$ is —H or —$CH_3$.

In certain embodiments, the present invention relates to the aforementioned method, wherein X is —O—; Z is —OH; n is 0; and $R^1$ is —H.

In certain embodiments, the present invention relates to the aforementioned method, wherein X is —O—; Z is —OH; n is 0; and $R^1$ is —$CH_3$.

In certain embodiments, the present invention relates to the aforementioned method, wherein X is —NH—; Z is —$R^2$; n is 0; and $R^1$ is —H.

In certain embodiments, the present invention relates to the aforementioned method, wherein X is —NH—; Z is —$R^2$; n is 0; and $R^1$ is —$CH_3$.

In certain embodiments, the present invention relates to the aforementioned method, wherein X is —NH—; Z is —H; n is 0; and $R^1$ is —H.

In certain embodiments, the present invention relates to the aforementioned method, wherein X is —NH—; Z is —H; n is 0; and $R^1$ is —$CH_3$.

In certain embodiments, the present invention relates to the aforementioned method, wherein X is —N($CH_3$)—; Z is —$CH_3$; n is 0; and $R^1$ is —H.

In certain embodiments, the present invention relates to the aforementioned method, wherein X is —N($CH_3$)—; Z is —$CH_3$; n is 0; and $R^1$ is —$CH_3$.

In certain embodiments, the present invention relates to the aforementioned method, wherein X is —$CH_2$—; Z is —N($R^2$)$_2$; n is 0, 1, 2 or 3; and $R^1$ is H or $CH_3$.

In certain embodiments, the present invention relates to the aforementioned method, wherein X is —$CH_2$—; Z is —N($R^2$)$_2$; n is 0, 1, 2 or 3; and $R^1$ is H or $CH_3$.

In certain embodiments, the present invention relates to the aforementioned method, wherein X is —$CH_2$—; Z is —N($R^2$)$_2$; n is 0, 1, 2 or 3; $R^1$ is H or $CH_3$; and $R^2$ is —H, —$CH_3$, —$CH_2CH_3$, —$CH_2CH_2CH_3$ or —$CH(CH_3)_2$.

In certain embodiments, the present invention relates to the aforementioned method, wherein X is —$CH_2$—; Z is —NH($R^2$); n is 1 or 2; $R^1$ is H or $CH_3$; and $R^2$ is —H, —$CH_3$, —$CH_2CH_3$, —$CH_2CH_2CH_3$ or —$CH(CH_3)_2$.

In certain embodiments, the present invention relates to the aforementioned method, wherein A is —O— or —N(H)—; B is —$CH_2$— or —$CH_2CH_2$—; and R is —H or —$CH_3$.

In certain embodiments, the present invention relates to the aforementioned method, wherein A is —O—; B is —$CH_2CH_2$—; and R is —H.

In certain embodiments, the present invention relates to the aforementioned method, wherein A is —O—; B is —$CH_2CH_2$—; and R is —$CH_3$.

In certain embodiments, the present invention relates to the aforementioned method, wherein A is —N(H)—; B is —$CH_2CH_2$—; and R is —H.

In certain embodiments, the present invention relates to the aforementioned method, wherein A is —N(H)—; B is —$CH_2CH_2$—; and R is —$CH_3$.

Another aspect of the invention relates to a method of forming a polymer coating on a surface of an article, comprising the steps of:

placing said article on a stage in a chemical vapor deposition reactor; wherein said stage is optionally maintained at about a first temperature;

mixing together a gaseous monomer at a first partial pressure, a gaseous initiator at a second partial pressure and, optionally, a gaseous crosslinker at a third partial pressure, thereby forming a reactive mixture; and contacting said surface of said article with said reactive mixture;

wherein said gaseous initiator is selected from the group consisting of peroxides, hydroperoxides, and diazines; said gaseous monomer is a compound of formula II; and said gaseous crosslinker is a compound of formula IV:

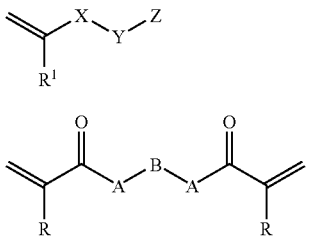

wherein, independently for each occurrence,
X is —O—, —S— or —N($R^2$)—;
A is —O—, —S— or —N($R^2$)—;
Y is —(C($R^2$)$_2$)$_n$—;
B is —(C($R^2$)$_2$)$_m$—;
Z is $R^2$, O$R^2$, S$R^2$, N($R^2$)$_2$ or —C(=O)$R^2$;
R is —H, —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)$_2$, or —C(CH)$_3$;
$R^1$ is —H, —CH$_3$, —CH$_2$CH$_3$, —CH$_2$CH$_2$CH$_3$, —CH(CH$_3$)$_2$, —C(CH)$_3$, —CH$_2$CH$_2$CH$_2$CH$_3$, —CH(CH$_3$)CH$_2$CH$_3$, or —CH$_2$CH(CH$_3$)$_2$;
$R^2$ is —H, —CH$_3$, —CH$_2$CH$_3$, —CH$_2$CH$_2$CH$_3$, —CH(CH$_3$)$_2$, —C(CH)$_3$, —CH$_2$CH$_2$CH$_2$CH$_3$, —CH(CH$_3$)CH$_2$CH$_3$, —CH$_2$CH(CH$_3$)$_2$, cycloalkyl, aryl or aralkyl;
n is 0 to 6 inclusive; and
m is 1 to 6 inclusive.

In certain embodiments, the present invention relates to the aforementioned method, wherein $R^1$ is —H or —CH$_3$.

In certain embodiments, the present invention relates to the aforementioned method, wherein $R^1$ is —H.

In certain embodiments, the present invention relates to the aforementioned method, wherein $R^1$ is —CH$_3$.

In certain embodiments, the present invention relates to the aforementioned method, wherein R is —H or —CH$_3$.

In certain embodiments, the present invention relates to the aforementioned method, wherein R is —H.

In certain embodiments, the present invention relates to the aforementioned method, wherein R is —CH$_3$.

In certain embodiments, the present invention relates to the aforementioned method, wherein X is —O—.

In certain embodiments, the present invention relates to the aforementioned method, wherein A is —O—.

In certain embodiments, the present invention relates to the aforementioned method, wherein A is —N(H)—.

In certain embodiments, the present invention relates to the aforementioned method, wherein B is —CH$_2$—, —CH$_2$CH$_2$—, —CH$_2$CH$_2$CH$_2$— or —CH$_2$CH$_2$CH$_2$CH$_2$—.

In certain embodiments, the present invention relates to the aforementioned method, wherein B is —CH$_2$— or —CH$_2$CH$_2$—.

In certain embodiments, the present invention relates to the aforementioned method, wherein X is —O—; and $R^1$ is —H or —CH$_3$.

In certain embodiments, the present invention relates to the aforementioned method, wherein Z is —C(=O)$R^2$; n is 0; and $R^1$ is —H or —CH$_3$.

In certain embodiments, the present invention relates to the aforementioned method, wherein X is —O—; Z is —C(=O)$R^2$; n is 0; and $R^1$ is —H or —CH$_3$.

In certain embodiments, the present invention relates to the aforementioned method, wherein X is —O—; Z is —C(=O)$R^2$; n is 0; and $R^1$ is —H.

In certain embodiments, the present invention relates to the aforementioned method, wherein X is —O—; Z is —C(=O)$R^2$; n is 0; and $R^1$ is —CH$_3$.

In certain embodiments, the present invention relates to the aforementioned method, wherein X is —O—; Z is H; n is 0; and $R^1$ is —H or —CH$_3$.

In certain embodiments, the present invention relates to the aforementioned method, wherein X is —O—; Z is H; n is 0; and $R^1$ is —H.

In certain embodiments, the present invention relates to the aforementioned method, wherein X is —O—; Z is H; n is 0; and $R^1$ is —CH$_3$.

In certain embodiments, the present invention relates to the aforementioned method, wherein A is —O— or —N(H)—; B is —CH$_2$— or —CH$_2$CH$_2$—; and R is —H or —CH$_3$.

In certain embodiments, the present invention relates to the aforementioned method, wherein A is —O—; B is —CH$_2$CH$_2$—; and R is —H.

In certain embodiments, the present invention relates to the aforementioned method, wherein A is —O—; B is —CH$_2$CH$_2$—; and R is —CH$_3$.

In certain embodiments, the present invention relates to the aforementioned method, wherein A is —N(H)—; B is —CH$_2$CH$_2$—; and R is —H.

In certain embodiments, the present invention relates to the aforementioned method, wherein A is —N(H)—; B is —CH$_2$CH$_2$—; and R is —CH$_3$.

Another aspect of the invention relates to a method of forming a polymer coating on a surface of an article, comprising the steps of:

placing said article on a stage in a chemical vapor deposition reactor; wherein said stage is optionally maintained at about a first temperature;

mixing together a gaseous monomer at a first partial pressure, a gaseous initiator at a second partial pressure and, optionally, a gaseous crosslinker at a third partial pressure, thereby forming a reactive mixture; and contacting said surface of said article with said reactive mixture;

wherein said gaseous initiator is selected from the group consisting of peroxides, hydroperoxides, and diazines; said gaseous monomer is a compound of formula III; and said gaseous crosslinker is a compound of formula IV:

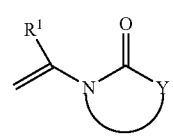

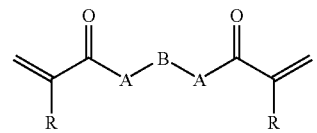

wherein, independently for each occurrence,
A is —C($R^2$)$_2$—, —O—, —S— or —N($R^2$)—;
Y is —(C($R^2$)$_2$)$_n$—;
B is —(C($R^2$)$_2$)$_m$—;
R is —H, —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)$_2$, or —C(CH)$_3$;

$R^1$ is —H, —$CH_3$, —$CH_2CH_3$, —$CH_2CH_2CH_3$, —CH($CH_3$)$_2$, —C(CH)$_3$, —$CH_2CH_2CH_2CH_3$, —CH($CH_3$)$CH_2CH_3$, or —$CH_2CH(CH_3)_2$;

$R^2$ is —H, —$CH_3$, —$CH_2CH_3$, —$CH_2CH_2CH_3$, —CH($CH_3$)$_2$, —$CH_2CH_2CH_2CH_3$, —CH($CH_3$)$CH_2CH_3$, —$CH_2CH(CH_3)_2$, —C(CH)$_3$, cycloalkyl, aryl or aralkyl;

n is 0 to 6 inclusive; and m is 1 to 6 inclusive.

In certain embodiments, the present invention relates to the aforementioned method, wherein $R^1$ is —H or —$CH_3$.

In certain embodiments, the present invention relates to the aforementioned method, wherein $R^1$ is —H.

In certain embodiments, the present invention relates to the aforementioned method, wherein $R^1$ is —$CH_3$.

In certain embodiments, the present invention relates to the aforementioned method, wherein R is —H or —$CH_3$.

In certain embodiments, the present invention relates to the aforementioned method, wherein R is —H.

In certain embodiments, the present invention relates to the aforementioned method, wherein R is —$CH_3$.

In certain embodiments, the present invention relates to the aforementioned method, wherein A is —O—.

In certain embodiments, the present invention relates to the aforementioned method, wherein A is —N(H)—.

In certain embodiments, the present invention relates to the aforementioned method, wherein Y is —$CH_2CH_2CH_2$— or —$CH_2CH_2CH_2CH_2$—.

In certain embodiments, the present invention relates to the aforementioned method, wherein B is —$CH_2$—, —$CH_2CH_2$—, —$CH_2CH_2CH_2$— or —$CH_2CH_2CH_2CH_2$.

In certain embodiments, the present invention relates to the aforementioned method, wherein B is —$CH_2$— or —$CH_2CH_2$—.

In certain embodiments, the present invention relates to the aforementioned method, wherein Y is —$CH_2CH_2CH_2$—; and $R^1$ is —H or —$CH_3$.

In certain embodiments, the present invention relates to the aforementioned method, wherein Y is —$CH_2CH_2CH_2$—; and $R^1$ is —H.

In certain embodiments, the present invention relates to the aforementioned method, wherein Y is —$CH_2CH_2CH_2$—; and $R^1$ is —$CH_3$.

In certain embodiments, the present invention relates to the aforementioned method, wherein A is —O— or —N(H)—; B is —$CH_2$— or —$CH_2CH_2$—; and R is —H or —$CH_3$.

In certain embodiments, the present invention relates to the aforementioned method, wherein A is —O—; B is —$CH_2CH_2$—; and R is —H.

In certain embodiments, the present invention relates to the aforementioned method, wherein A is —O—; B is —$CH_2CH_2$—; and R is —$CH_3$.

In certain embodiments, the present invention relates to the aforementioned method, wherein A is —N(H)—; B is —$CH_2CH_2$—; and R is —H.

In certain embodiments, the present invention relates to the aforementioned method, wherein A is —N(H)—; B is —$CH_2CH_2$—; and R is —$CH_3$.

In certain embodiments, the present invention relates to an aforementioned method, wherein the ratio of said crosslinker to said monomer is about 0.5.

In certain embodiments, the present invention relates to an aforementioned method, wherein the ratio of said crosslinker to said monomer is about 0.4.

In certain embodiments, the present invention relates to an aforementioned method, wherein the ratio of said crosslinker to said monomer is about 0.3.

In certain embodiments, the present invention relates to an aforementioned method, wherein the ratio of said crosslinker to said monomer is about 0.2.

In certain embodiments, the present invention relates to an aforementioned method, wherein the ratio of said crosslinker to said monomer is about 0.1.

In certain embodiments, the present invention relates to an aforementioned method, wherein the ratio of said crosslinker to said monomer is about 0.

In certain embodiments, the present invention relates to the aforementioned method, wherein said coating is of a uniform thickness (i.e., said thickness does not vary more than about 10% over the surface; or by more than about 5% over the surface; or by more than about 1% over the surface).

In certain embodiments, the present invention relates to the aforementioned method, wherein said polymer coating has a mass per surface area of less than about 500 μg/cm$^2$.

In certain embodiments, the present invention relates to the aforementioned method, wherein said polymer coating has a mass per surface area of less than about 100 μg/cm$^2$.

In certain embodiments, the present invention relates to the aforementioned method, wherein said polymer coating has a mass per surface area of less than about 50 μg/cm$^2$.

In certain embodiments, the present invention relates to the aforementioned method, wherein said polymer coating has a mass per surface area of less than about 10 μg/cm$_2$.

In certain embodiments, the present invention relates to the aforementioned method, wherein said polymer coating has a mass per surface area of less than about 5 μg/cm$^2$.

In certain embodiments, the present invention relates to the aforementioned method, wherein said coating has an ultimate receding angle of less than about 50% (i.e., said thickness does not vary more than about 10% over the surface; or by more than about 5% over the surface; or by more than about 1% over the surface).

In certain embodiments, the present invention relates to the aforementioned method, wherein said polymer coating has an ultimate receding angle of less than about 40%.

In certain embodiments, the present invention relates to the aforementioned method, wherein said polymer coating has an ultimate receding angle of less than about 30%.

In certain embodiments, the present invention relates to the aforementioned method, wherein said polymer coating has an ultimate receding angle of less than about 20%.

In certain embodiments, the present invention relates to the aforementioned method, wherein said polymer coating has an ultimate receding angle of less than about 10%.

In certain embodiments, the present invention relates to the aforementioned method, wherein said polymer coating has a dangling bond density of less than about $10^{20}$ spins/cm$^3$. One method of measuring the dangling bond density is electron spin resonance (ESR).

In certain embodiments, the present invention relates to the aforementioned method, wherein said polymer coating has a dangling bond density of less than about $10^{18}$ spins/cm$^3$.

In certain embodiments, the present invention relates to the aforementioned method, wherein said polymer coating has a dangling bond density of less than about $10^{16}$ spins/cm$^3$.

In certain embodiments, the present invention relates to the aforementioned method, wherein said polymer coating has an onset of decomposition in the range of about 220° C. to about 350° C.

In certain embodiments, the present invention relates to the aforementioned method, wherein said polymer coating has an onset of decomposition in the range of about 270° C. to about 300° C.

In certain embodiments, the present invention relates to the aforementioned method, wherein said polymer coating is a hydrogel.

In certain embodiments, the present invention relates to the aforementioned method, wherein said polymer coating is a hydrogel; and said maximum water content of said hydrogel is about 35% v/v.

In certain embodiments, the present invention relates to the aforementioned method, wherein said polymer coating is a hydrogel; and said maximum water content of said hydrogel is about 20% v/v.

In certain embodiments, the present invention relates to the aforementioned method, wherein said polymer coating is a hydrogel; and said maximum water content of said hydrogel is about 10% v/v.

In certain embodiments, the present invention relates to the aforementioned method, wherein said polymer coating is a hydrogel; and said maximum water content of said hydrogel is about 5% v/v.

In certain embodiments, the present invention relates to the aforementioned method, wherein said first temperature is about 25° C. to about 45° C.

In certain embodiments, the present invention relates to the aforementioned method, wherein said first temperature is about 35° C.

In certain embodiments, the present invention relates to the aforementioned method, wherein said first partial pressure is about 1 mTorr to about 1000 mTorr.

In certain embodiments, the present invention relates to the aforementioned method, wherein said first partial pressure is about 100 mTorr to about 500 mTorr.

In certain embodiments, the present invention relates to the aforementioned method, wherein said first partial pressure is about 150 mTorr to about 350 mTorr.

In certain embodiments, the present invention relates to the aforementioned method, wherein said first partial pressure is about 150 mTorr to about 150 mTorr.

In certain embodiments, the present invention relates to the aforementioned method, wherein said third partial pressure is about 1 mTorr to about 500 mTorr.

In certain embodiments, the present invention relates to the aforementioned method, wherein said third partial pressure is about 10 mTorr to about 200 mTorr.

In certain embodiments, the present invention relates to the aforementioned method, wherein said third partial pressure is about 1 mTorr to about 500 mTorr.

In certain embodiments, the present invention relates to the aforementioned method, wherein said third partial pressure is about 25 mTorr to about 100 mTorr.

In certain embodiments, the present invention relates to the aforementioned method, wherein said third partial pressure is about 50 mTorr to about 75 mTorr.

In certain embodiments, the present invention relates to the aforementioned method, wherein said gaseous initiator is selected from the group consisting of compounds of formula V:

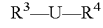
                                            V wherein, independently for each occurrence, $R^3$ is alkyl, cycloalkyl, aryl or aralkyl;

U is —O—O— or —N=N—; and $R^4$ is hydrogen, alkyl, cycloalkyl, aryl or aralkyl.

In certain embodiments, the present invention relates to the aforementioned method, wherein $R^3$ is alkyl.

In certain embodiments, the present invention relates to the aforementioned method, wherein $R^4$ is hydrogen or alkyl.

In certain embodiments, the present invention relates to the aforementioned method, wherein $R^4$ is hydrogen.

In certain embodiments, the present invention relates to the aforementioned method, wherein $R^4$ is alkyl.

In certain embodiments, the present invention relates to the aforementioned method, wherein U is —O—O—.

In certain embodiments, the present invention relates to the aforementioned method, wherein U is —N=N—.

In certain embodiments, the present invention relates to the aforementioned method, wherein $R^3$ is —C(CH)$_3$; and $R^4$ is —C(CH)$_3$.

In certain embodiments, the present invention relates to the aforementioned method, wherein $R^3$ is —C(CH)$_3$; U is —O—O—; and $R^4$ is —C(CH)$_3$.

In certain embodiments, the present invention relates to an aforementioned method, wherein at least one surface of said article is paper, ceramic, carbon, silicon, nylon, polyester, polyurethane, polyanhydride, polyorthoester, polyacrylonitrile, polyphenazine, latex, teflon, dacron, acrylate polymer, chlorinated rubber, fluoropolymer, polyamide resin, vinyl resin, Gore-tex®, Marlex®, expanded polytetrafluoroethylene (e-PTFE), low density polyethylene (LDPE), high density polyethylene (HDPE), polypropylene (PP), or poly(ethylene terephthalate) (PET).

Articles of the Invention

One aspect of the invention relates to an article coated with a polymer coating, wherein said coating comprises a monomer of formula I, II, or III, and optionally further comprises a crosslinker of formula IV:

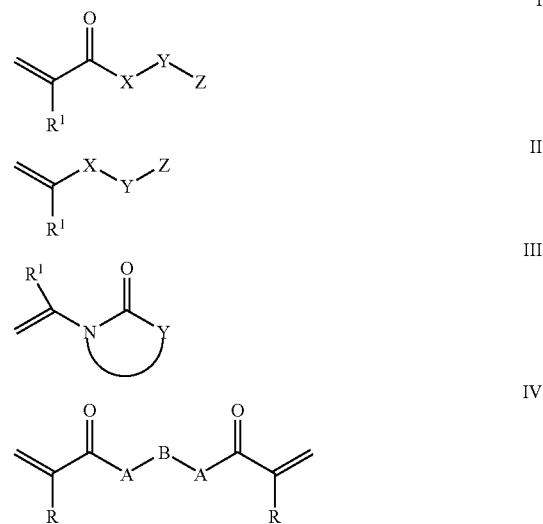

wherein, independently for each occurrence,

X is —C(R$^2$)$_2$—, —O—, —S— or —N(R$^2$)—;

A is —C(R$^2$)$_2$—, —O—, —S— or —N(R$^2$)—

Y is —(C(R$^2$)$_2$)$_n$—;

B is —(C(R$^2$)$_2$)$_m$;

Z is R$^2$, OR$^2$, SR$^2$, N(R$^2$)$_2$ or —C(=O)R$^2$;

R is —H, —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)$_2$, or —C(CH)$_3$;

R$^1$ is —H, —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)$_2$, —C(CH)$_3$, —CH$_2$COOH, —CH$_2$CH$_2$COOH or —CH$_2$CH$_2$CH$_2$COOH;

R² is —H, —CH₃, —CH₂CH₃, —CH₂CH₂CH₃, —CH(CH₃)₂, —CH₂CH₂CH₂CH₃, —CH(CH₃)CH₂CH₃, —CH₂CH(CH₃)₂, —C(CH)₃, cycloalkyl, aryl or aralkyl;

n is 0 to 6 inclusive; and m is 1 to 6 inclusive.

Another aspect of the invention relates to an article coated with a polymer coating, wherein said coating comprises a monomer of formula I and optionally further comprises a crosslinker of formula IV:

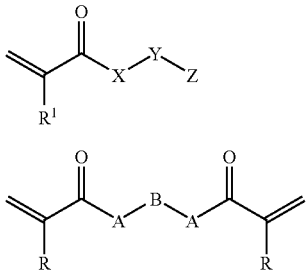

wherein, independently for each occurrence,

X is —C(R²)₂—, —O—, —S— or —N(R²)—;

A is —O—, —S— or —N(R²)—;

Y is —(C(R²)₂)ₙ—;

B is —(C(R²)₂)ₘ—;

Z is R², OR², SR², or N(R²)₂;

R is —H, —CH₃, —CH₂CH₃, —CH₂CH₂CH₃, —CH(CH₃)₂, —CH₂CH₂CH₂CH₃, —CH(CH₃)CH₂CH₃, —CH₂CH(CH₃)₂, or —C(CH)₃;

R¹ is —H, —CH₃, —CH₂CH₃, —CH₂CH₂CH₃, —CH(CH₃)₂, —C(CH)₃, —CH₂CH₂CH₂CH₃, —CH(CH₃)CH₂CH₃, or —CH₂CH(CH₃)₂;

R² is —H, —CH₃, —CH₂CH₃, —CH₂CH₂CH₃, —CH(CH₃)₂, —CH₂CH₂CH₂CH₃, —CH(CH₃)CH₂CH₃, —CH₂CH(CH₃)₂, —C(CH)₃, cycloalkyl, aryl or aralkyl;

n is 0 to 6 inclusive; and m is 1 to 6 inclusive.

In certain embodiments, the present invention relates to the aforementioned article, wherein R¹ is —H or —CH₃.

In certain embodiments, the present invention relates to the aforementioned article, wherein R¹ is —H.

In certain embodiments, the present invention relates to the aforementioned article, wherein R¹ is —CH₃.

In certain embodiments, the present invention relates to the aforementioned method, wherein R is —H or —CH₃.

In certain embodiments, the present invention relates to the aforementioned method, wherein R is —H.

In certain embodiments, the present invention relates to the aforementioned method, wherein R is —CH₃.

In certain embodiments, the present invention relates to the aforementioned article, wherein X is —O— or —NH—.

In certain embodiments, the present invention relates to the aforementioned article, wherein X is —O—.

In certain embodiments, the present invention relates to the aforementioned article, wherein X is —NH—.

In certain embodiments, the present invention relates to the aforementioned article, wherein A is —O— or —NH—.

In certain embodiments, the present invention relates to the aforementioned article, wherein A is —O—.

In certain embodiments, the present invention relates to the aforementioned article, wherein A is —NH—.

In certain embodiments, the present invention relates to the aforementioned article, wherein Y is —CH₂—, —CH₂CH₂—, —CH₂CH₂CH₂— or —CH₂CH₂CH₂CH₂—.

In certain embodiments, the present invention relates to the aforementioned article, wherein Y is —CH₂— or —CH₂CH₂—.

In certain embodiments, the present invention relates to the aforementioned article, wherein B is —CH₂—, —CH₂CH₂—, —CH₂CH₂CH₂— or —CH₂CH₂CH₂CH₂—.

In certain embodiments, the present invention relates to the aforementioned article, wherein B is —CH₂— or —CH₂CH₂—.

In certain embodiments, the present invention relates to the aforementioned article, wherein Z is OH, NH(R²) or N(R²)₂.

In certain embodiments, the present invention relates to the aforementioned article, wherein Z is OH.

In certain embodiments, the present invention relates to the aforementioned article, wherein Z is NH(R²).

In certain embodiments, the present invention relates to the aforementioned article, wherein Z is N(R²)₂.

In certain embodiments, the present invention relates to the aforementioned article, wherein X is —O— or —N(R²)—; Y is —(CH₂)ₙ—; Z is —OH; n is 1, 2, 3 or 4; and R¹ is —H or —CH₃.

In certain embodiments, the present invention relates to the aforementioned article, wherein X is —O—; Y is —(CH₂)ₙ—; Z is —OH; n is 1, 2, 3 or 4; and R¹ is —H or —CH₃.

In certain embodiments, the present invention relates to the aforementioned article, wherein X is —N(R²)—; Y is —(CH₂)ₙ—; Z is —OH; n is 1, 2, 3 or 4; and R¹ is —H or —CH₃.

In certain embodiments, the present invention relates to the aforementioned article, wherein X is —O—; Y is —(CH₂)ₙ—; Z is —OH; n is 2; and R¹ is —H.

In certain embodiments, the present invention relates to the aforementioned article, wherein X is —O—; Y is —(CH₂)ₙ—; Z is —OH; n is 2; and R¹ is —CH₃.

In certain embodiments, the present invention relates to the aforementioned article, wherein X is —O— or —N(R²); Z is —OH; n is 0; and R¹ is —H or —CH₃.

In certain embodiments, the present invention relates to the aforementioned article, wherein X is —O—; Z is —OH; n is 0; and R¹ is —H.

In certain embodiments, the present invention relates to the aforementioned article, wherein X is —O—; Z is —OH; n is 0; and R¹ is —CH₃.

In certain embodiments, the present invention relates to the aforementioned article, wherein X is —NH—; Z is —R²; n is 0; and R¹ is —H.

In certain embodiments, the present invention relates to the aforementioned article, wherein X is —NH—; Z is —R²; n is 0; and R¹ is —CH₃.

In certain embodiments, the present invention relates to the aforementioned article, wherein X is —NH—; Z is —H; n is 0; and R¹ is —H.

In certain embodiments, the present invention relates to the aforementioned article, wherein X is —NH—; Z is —H; n is 0; and R¹ is —CH₃.

In certain embodiments, the present invention relates to the aforementioned article, wherein X is —N(CH₃)—; Z is —CH₃; n is 0; and R¹ is —H.

In certain embodiments, the present invention relates to the aforementioned article, wherein X is —N(CH₃)—; Z is —CH₃; n is 0; and R¹ is —CH₃.

In certain embodiments, the present invention relates to the aforementioned article, wherein X is —CH₂—; Z is —N(R²)₂; n is 0, 1, 2 or 3; and R¹ is H or CH₃.

In certain embodiments, the present invention relates to the aforementioned article, wherein X is —CH$_2$—; Z is N(R$^2$)$_2$; n is 0, 1, 2 or 3; and R$^1$ is H or CH$_3$.

In certain embodiments, the present invention relates to the aforementioned article, wherein X is —CH$_2$—; Z is —N(R$^2$)$_2$; n is 0, 1, 2 or 3; R$^1$ is H or CH$_3$; and R$^2$ is —H, —CH$_3$, —CH$_2$CH$_3$, —CH$_2$CH$_2$CH$_3$ or —CH(CH$_3$)$_2$.

In certain embodiments, the present invention relates to the aforementioned article, wherein X is —CH$_2$—; Z is —NH(R$^2$); n is 1 or 2; R$^1$ is H or CH$_3$; and R$^2$ is —H, —CH$_2$CH$_3$, —CH$_2$CH$_2$CH$_3$ or —CH(CH$_3$)$_2$.

In certain embodiments, the present invention relates to the aforementioned article, wherein A is —O— or —N(H)—; B is —CH$_2$— or —CH$_2$CH$_2$—; and R is —H or —CH$_3$.

In certain embodiments, the present invention relates to the aforementioned article, wherein A is —O—; B is —CH$_2$CH$_2$—; and R is —H.

In certain embodiments, the present invention relates to the aforementioned article, wherein A is —O—; B is —CH$_2$CH$_2$—; and R is —CH$_3$.

In certain embodiments, the present invention relates to the aforementioned article, wherein A is —N(H)—; B is —CH$_2$CH$_2$—; and R is —H.

In certain embodiments, the present invention relates to the aforementioned article, wherein A is —N(H)—; B is —CH$_2$CH$_2$—; and R is —CH$_3$.

Another aspect of the invention relates to an article coated with a polymer coating, wherein said coating comprises a monomer of formula II, and optionally further comprises a crosslinker of formula IV:

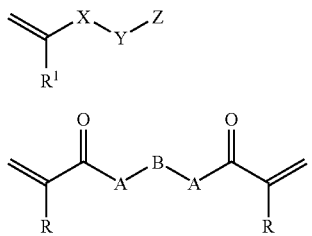

wherein, independently for each occurrence,
X is —O—, —S— or —N(R$^2$)—;
A is —O—, —S— or —N(R$^2$)—;
Y is —(C(R$^2$)$_2$)$_n$—;
B is —(C(R$^2$)$_2$)$_m$—;
Z is R$^2$, OR$^2$, SR$^2$, N(R$^2$)$_2$ or —C(=O)R$^2$;
R is —H, —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)$_2$, or —C(CH)$_3$;
R$^1$ is —H, —CH$_3$, —CH$_2$CH$_3$, —CH$_2$CH$_2$CH$_3$, —CH(CH$_3$)$_2$, —C(CH)$_3$, —CH$_2$CH$_2$CH$_2$CH$_3$, —CH(CH$_3$)CH$_2$CH$_3$, or —CH$_2$CH(CH$_3$)$_2$;
R$^2$ is —H, —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)$_2$, —C(CH)$_3$, cycloalkyl, aryl or aralkyl;
n is 0 to 6 inclusive; and
m is 1 to 6 inclusive.

In certain embodiments, the present invention relates to the aforementioned method, wherein R$^1$ is —H or —CH3.

In certain embodiments, the present invention relates to the aforementioned method, wherein R$^1$ is —H.

In certain embodiments, the present invention relates to the aforementioned method, wherein R$^1$ is —CH$_3$.

In certain embodiments, the present invention relates to the aforementioned method, wherein R is —H or —CH$_3$.

In certain embodiments, the present invention relates to the aforementioned method, wherein R is —H.

In certain embodiments, the present invention relates to the aforementioned method, wherein R is —CH$_3$.

In certain embodiments, the present invention relates to the aforementioned article, wherein X is —O—.

In certain embodiments, the present invention relates to the aforementioned article, wherein A is —O—.

In certain embodiments, the present invention relates to the aforementioned article, wherein A is —N(H)—.

In certain embodiments, the present invention relates to the aforementioned article, wherein B is —CH$_2$—, —CH$_2$CH$_2$—, —CH$_2$CH$_2$CH$_2$— or —CH$_2$CH$_2$CH$_2$CH$_2$—.

In certain embodiments, the present invention relates to the aforementioned article, wherein B is —CH$_2$— or —CH$_2$CH$_2$—.

In certain embodiments, the present invention relates to the aforementioned article, wherein X is —O—; and R$^1$ is —H or —CH$_3$.

In certain embodiments, the present invention relates to the aforementioned article, wherein Z is —C(=O)R$^2$; n is 0; and R$^1$ is —H or —CH$_3$.

In certain embodiments, the present invention relates to the aforementioned article, wherein X is —O—; Z is —C(=O)R$^2$; n is 0; and R$^1$ is —H or —CH$_3$.

In certain embodiments, the present invention relates to the aforementioned article, wherein X is —O—; Z is —C(=O)R$^2$; n is 0; and R$^1$ is —H.

In certain embodiments, the present invention relates to the aforementioned article, wherein X is —O—; Z is —C(=O)R$^2$; n is 0; and R$^1$ is —CH$_3$.

In certain embodiments, the present invention relates to the aforementioned article, wherein X is —O—; Z is H; n is 0; and R$^1$ is —H or —CH$_3$.

In certain embodiments, the present invention relates to the aforementioned article, wherein X is —O—; Z is H; n is 0; and R$^1$ is —H.

In certain embodiments, the present invention relates to the aforementioned article, wherein X is —O—; Z is H; n is 0; and R$^1$ is —CH$_3$.

In certain embodiments, the present invention relates to the aforementioned article, wherein A is —O— or —N(H)—; B is —CH$_2$— or —CH$_2$CH$_2$—; and R is —H or —CH$_3$.

In certain embodiments, the present invention relates to the aforementioned article, wherein A is —O—; B is —CH$_2$CH$_2$—; and R is —H.

In certain embodiments, the present invention relates to the aforementioned article, wherein A is —O—; B is —CH$_2$CH$_2$—; and R is —CH$_3$.

In certain embodiments, the present invention relates to the aforementioned article, wherein A is —N(H)—; B is —CH$_2$CH$_2$—; and R is —H.

In certain embodiments, the present invention relates to the aforementioned article, wherein A is —N(H)—; B is —CH$_2$CH$_2$—; and R is —CH$_3$.

Another aspect of the invention relates to an article coated with a polymer coating, wherein said coating comprises a monomer of formula III, and optionally further comprises a crosslinker of formula IV:

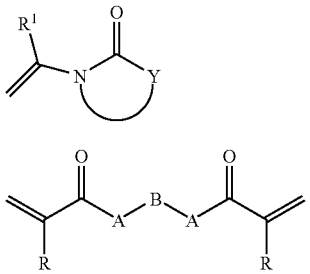

wherein, independently for each occurrence,

A is —C(R$^2$)$_2$—, —O—, —S— or —N(R$^2$)—;

Y is —(C(R$^2$)$_2$)$_n$—;

B is —(C(R$^2$)$_2$)$_m$—

R is —H, —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)$_2$, or —C(CH)$_3$;

R$^1$ is —H, —CH$_3$, —CH$_2$CH$_3$, —CH$_2$CH$_2$CH$_3$, —CH(CH$_3$)$_2$, —C(CH)$_3$, —CH$_2$CH$_2$CH$_2$CH$_3$, —CH(CH$_3$)CH$_2$CH$_3$, or —CH$_2$CH(CH$_3$)$_2$;

R$^2$ is —H, —CH$_3$, —CH$_2$CH$_3$, —CH$_2$CH$_2$CH$_3$, —CH(CH$_3$)$_2$, —C(CH)$_3$, —CH$_2$CH$_2$CH$_2$CH$_3$, —CH(CH$_3$)CH$_2$CH$_3$, —CH$_2$CH(CH$_3$)$_2$, cycloalkyl, aryl or aralkyl;

n is 0 to 6 inclusive; and m is 1 to 6 inclusive.

In certain embodiments, the present invention relates to the aforementioned method, wherein R$^1$ is —H or —CH$_3$.

In certain embodiments, the present invention relates to the aforementioned method, wherein R$^1$ is —H.

In certain embodiments, the present invention relates to the aforementioned method, wherein R$^1$ is —CH$_3$.

In certain embodiments, the present invention relates to the aforementioned method, wherein R is —H or —CH$_3$.

In certain embodiments, the present invention relates to the aforementioned method, wherein R is —H.

In certain embodiments, the present invention relates to the aforementioned method, wherein R is —CH$_3$.

In certain embodiments, the present invention relates to the aforementioned article, wherein A is —O—.

In certain embodiments, the present invention relates to the aforementioned article, wherein A is —N(H)—.

In certain embodiments, the present invention relates to the aforementioned article, wherein Y is —CH$_2$CH$_2$CH$_2$— or —CH$_2$CH$_2$CH$_2$CH$_2$—.

In certain embodiments, the present invention relates to the aforementioned article, wherein B is —CH$_2$—, —CH$_2$CH$_2$—, —CH$_2$CH$_2$CH$_2$— or —CH$_2$CH$_2$CH$_2$CH$_2$—.

In certain embodiments, the present invention relates to the aforementioned article, wherein B is —CH$_2$— or —CH$_2$CH$_2$—.

In certain embodiments, the present invention relates to the aforementioned article, wherein R$^1$ is —H or —CH$_3$.

In certain embodiments, the present invention relates to the aforementioned article, wherein Y is —CH$_2$CH$_2$CH$_2$—; and R$^1$ is —H or —CH$_3$.

In certain embodiments, the present invention relates to the aforementioned article, wherein Y is —CH$_2$CH$_2$CH$_2$—; and R$^1$ is —H.

In certain embodiments, the present invention relates to the aforementioned article, wherein Y is —CH$_2$CH$_2$CH$_2$—; and R$^1$ is —CH$_3$.

In certain embodiments, the present invention relates to the aforementioned article, wherein A is —O— or —N(H)—; B is —CH$_2$— or —CH$_2$CH$_2$—; and R is —H or —CH$_3$.

In certain embodiments, the present invention relates to the aforementioned article, wherein A is —O—; B is —CH$_2$CH$_2$—; and R is —H.

In certain embodiments, the present invention relates to the aforementioned article, wherein A is —O—; B is —CH$_2$CH$_2$—; and R is —CH$_3$.

In certain embodiments, the present invention relates to the aforementioned article, wherein A is —N(H)—; B is —CH$_2$CH$_2$—; and R is —H.

In certain embodiments, the present invention relates to the aforementioned article, wherein A is —N(H)—; B is —CH$_2$CH$_2$—; and R is —CH$_3$.

In certain embodiments, the present invention relates to an aforementioned article, wherein the ratio of said crosslinker to said monomer is about 0.5.

In certain embodiments, the present invention relates to an aforementioned article, wherein the ratio of said crosslinker to said monomer is about 0.4.

In certain embodiments, the present invention relates to an aforementioned article, wherein the ratio of said crosslinker to said monomer is about 0.3.

In certain embodiments, the present invention relates to an aforementioned article, wherein the ratio of said crosslinker to said monomer is about 0.2.

In certain embodiments, the present invention relates to an aforementioned article, wherein the ratio of said crosslinker to said monomer is about 0.1.

In certain embodiments, the present invention relates to an aforementioned article, wherein the ratio of said crosslinker to said monomer is about 0.

In certain embodiments, the present invention relates to the aforementioned article, wherein said coating is of a uniform thickness (i.e., said thickness does not vary more than about 10% over the surface of the article; or by more than about 5% over the surface of the article; or by more than about 1% over the surface of the article).

In certain embodiments, the present invention relates to the aforementioned article, wherein said polymer coating has a mass per surface area of less than about 500 μg/cm$^2$.

In certain embodiments, the present invention relates to the aforementioned article, wherein said polymer coating has a mass per surface area of less than about 100 μg/cm$^2$.

In certain embodiments, the present invention relates to the aforementioned article, wherein said polymer coating has a mass per surface area of less than about 50 μg/cm$^2$.

In certain embodiments, the present invention relates to the aforementioned article, wherein said polymer coating has a mass per surface area of less than about 10 μg/cm$^2$.

In certain embodiments, the present invention relates to the aforementioned article, wherein said polymer coating has a mass per surface area of less than about 5 μg/cm$^2$.

In certain embodiments, the present invention relates to the aforementioned article, wherein said coating has an ultimate receding angle of less than about 50% (i.e., said thickness does not vary more than about 10% over the surface of the article; or by more than about 5% over the surface of the article; or by more than about 1% over the surface of the article).

In certain embodiments, the present invention relates to the aforementioned article, wherein said polymer coating has an ultimate receding angle of less than about 40%.

In certain embodiments, the present invention relates to the aforementioned article, wherein said polymer coating has an ultimate receding angle of less than about 30%.

In certain embodiments, the present invention relates to the aforementioned article, wherein said polymer coating has an ultimate receding angle of less than about 20%.

In certain embodiments, the present invention relates to the aforementioned article, wherein said polymer coating has an ultimate receding angle of less than about 10%.

In certain embodiments, the present invention relates to the aforementioned article, wherein said polymer coating has a dangling bond density of less than about $10^{20}$ spins/cm$^3$.

In certain embodiments, the present invention relates to the aforementioned article, wherein said polymer coating has a dangling bond density of less than about $10^{18}$ spins/cm$^3$.

In certain embodiments, the present invention relates to the aforementioned article, wherein said polymer coating has a dangling bond density of less than about $10^{16}$ spins/cm$^3$.

In certain embodiments, the present invention relates to the aforementioned article, wherein said polymer coating has an onset of decomposition in the range of about 220° C. to about 350° C.

In certain embodiments, the present invention relates to the aforementioned article, wherein said polymer coating has an onset of decomposition in the range of about 270° C. to about 300° C.

In certain embodiments, the present invention relates to the aforementioned article, wherein said polymer coating is a hydrogel.

In certain embodiments, the present invention relates to the aforementioned article, wherein said polymer coating is a hydrogel; and said maximum water content of said hydrogel is about 35% v/v.

In certain embodiments, the present invention relates to the aforementioned article, wherein said polymer coating is a hydrogel; and said maximum water content of said hydrogel is about 20% v/v.

In certain embodiments, the present invention relates to the aforementioned article, wherein said polymer coating is a hydrogel; and said maximum water content of said hydrogel is about 10% v/v.

In certain embodiments, the present invention relates to the aforementioned article, wherein said polymer coating is a hydrogel; and said maximum water content of said hydrogel is about 5% v/v.

In certain embodiments, the present invention relates to an aforementioned article, wherein at least one surface of said article is paper, ceramic, carbon, silicon, nylon, polyester, polyurethane, polyanhydride, polyorthoester, polyacrylonitrile, polyphenazine, latex, teflon, dacron, acrylate polymer, chlorinated rubber, fluoropolymer, polyamide resin, vinyl resin, Gore-tex®, Marlex®, expanded polytetrafluoroethylene (e-PTFE), low density polyethylene (LDPE), high density polyethylene (HDPE), polypropylene (PP), or poly(ethylene terephthalate) (PET).

Selected Applications of the Polymer Coatings of the Invention

The properties of the inventive films, and the method of preparing them via iCVD on a surface, lend themselves to varied array of applications ranging from biomedical devices to clothing. In certain embodiments the inventive films may be used in biomedical applications (e.g., to coat filters/membranes, DNA microarrays, biochips, functional membranes, 96-well trays or centrifuges), in optics (e.g., to coat optical waveguides and communication devices, optical filters or optic fibers), in medical devices (e.g., medical blades, surgical sutures, syringes, fine wires-pacemakers, neural probes, inhalers, stents, needles, filters/membranes, forceps, or endoscopic tools), in kitchenware (e.g., roasters, quiche pans, pressure pots, poultry cookers, pots, pizza pans, microwave browning trays, breadmaker pans, bakeware, egg rings, knives, ladles, ice trays, sandwich makers, shot glasses, spatulas, spoons, stock pots, stovetops, waffle irons, utensils, or beaters), cutting edges (e.g., razor blades, knives, scissors or pruners), microfluid delivery (e.g., microcontact printing or ink-jet printer parts), government projects (e.g., ferroelectrics or NASA specifications), hydrophobic "self cleaning" and waterproofing surfaces (e.g., stain-proof fabrics, sleeping bags, tents, waterproof clothing, condensers-for drop-wise condensation, shoes, hats, swim suits, eye-glasses, windows-home, car windshield, plane windows, watch parts, display glass/plastic, coatings for tiles/metals or rugs/carpets), reduced fiction/drag reduction applications (e.g., the underside of ships, waterslides, skies/snowboards, ice-skates/sleds, propellers, golf balls, swimming caps, lubrication of motors, dental floss, bearing housings, bearings, agitators, pistons, saw blades, fan blades, hinge pins, knuckle joints, chutes or toggle joints), corrosion resistance (e.g., screws, nails, bolts, nuts, rivets, clamps, gears, gaskets, dry vents, exhaust systems, springs, water valves, wire cloth or wire goods), anti-foging (e.g., goggles, mirrors or windows), anti-fouling (heat exchangers/air conditioners/refrigerators, coatings on the inside of tubes and pipes, seals-valves or "O" rings), protective coatings (e.g., coating on the outside of wires/fibers/cables, sensors, protective coating on art, toys, microelectronics, particles and fibers for composite/reinforced materials, antistiction/seals, MEMS (micro electrical mechanical systems), X-ray tubes, zippers, insulators or lavatory bowls) or generalized mechanical systems (e.g., jet engine components, turbo pump components, chemical processing equipment, dairy process equipment, marine components, power tool components, photocopier parts, printing equipment pump components, web press parts or automotive components).

According to one aspect of the present invention there is provided a method for preparing particles of an active substance coated with at least one layer of inventive film. By "active substance" is meant a substance capable of performing some useful function in an end product, whether pharmaceutical, nutritional, herbicidal, pesticidal or whatever. The term is intended to embrace substances whose function is as a carrier, diluent or bulking agent.

The active substance may be a single active substance or a mixture of two or more. It may be monomeric, oligomeric or polymeric, organic (including organometallic) or inorganic, hydrophilic or hydrophobic. It may be a small molecule, for instance a synthetic drug like paracetamol, or a larger molecule such as a (poly)peptide, an enzyme, an antigen or other biological material. It is typically (although not necessarily) crystalline or semi-crystalline, preferably crystalline, by which is meant that it is capable of existing in a crystalline form under the chosen operating conditions.

The active substance preferably comprises a pharmaceutically active substance, although many other active substances, whatever their intended function (for instance, herbicides, pesticides, foodstuffs, nutriceuticals, dyes, perfumes, cosmetics, detergents, etc.), may be coformulated with additives in accordance with the invention.

In certain embodiments the active substance may be a material (such as a drug) intended for consumption, which has an unpleasant taste and/or odour and needs to be coated with a taste masking agent. Examples include, but are not limited to, the bitter tasting anti-malarial drugs quinine sulphate and chloroquine; many oral corticosteroids such as are used for asthma treatment; many antibiotics; Dicyclomine HCl (anti-spasmodic); dipyridamole (platelet inhibitor); Toprimate (anti-epileptic); Oxycodone (analgesic); Carispodol (used in the treatment of hyperactivity of skeletal muscles); Bupropion (antidepressant); Sumatripan (used in migraine treatment); Verapamil HCl (calcium ion flux inhibitor); Tinidazole (anti-parasitic); acetyl salicylic acid (aspirin, anti-pyretic); Cimetidine HCl (used in the treatment of acid/peptic disorders); Diltiazem HCl (anti-anginal); theophylline; paracetamol; and Orphenadrine citrate (anti-muscarinic). Clearly this list is not exhaustive.

In other embodiments the active substance may be a material which requires a protective coating because it is sensitive to heat, light, moisture, oxygen, chemical contaminants or other environmental influences, or because of its incompatibility with other materials with which it has to be stored or processed.

Active substance instability can be a particularly acute problem in the case of pharmaceuticals, since degradation can lead not only to a reduction in the active substance concentration or its bioavailability, but also in cases to the generation of toxic products and/or to an undesirable change in physical form or appearance. The most common reasons for degradation of drug substances exposed to atmospheric stresses are oxidation, hydrolysis and photochemical decomposition.

Actives susceptible to hydrolysis typically contain one or more of the following functional groups: amides (e.g., as in dibucaine, benzyl penicillin, sodium chloramphenicol and ergometrine); esters (e.g., as in procaine, tetracaine, methyladopate and physostigmine); lactams (e.g, as in cephalosporin, nitrazepam and chlorodiazeproxide); lactones (e.g, as in pilocarpine and spironolactone); oximes (e.g, as in steroid oximes); imides (e.g, as in glutethimide and ethosuximide); malonic urease (e.g, as in barbiturates); and nitrogen mustards (e.g, as in melphalan).

Actives that undergo photochemical decomposition include hydrocortisone, prednisolone, some vitamins such as ascorbic acid (vitamin C), phenothiazine and folic acid. Those that can be affected by oxidative degradation, often under ambient conditions, include morphine, dopamine, adrenaline, steroids, antibiotics and vitamins.

In other embodiments the coating of the active substance may assist in the controlled release of said substance.

iCVD of Poly(2-hydroxyethyl methacrylate) Homopolymer

Figure 2:
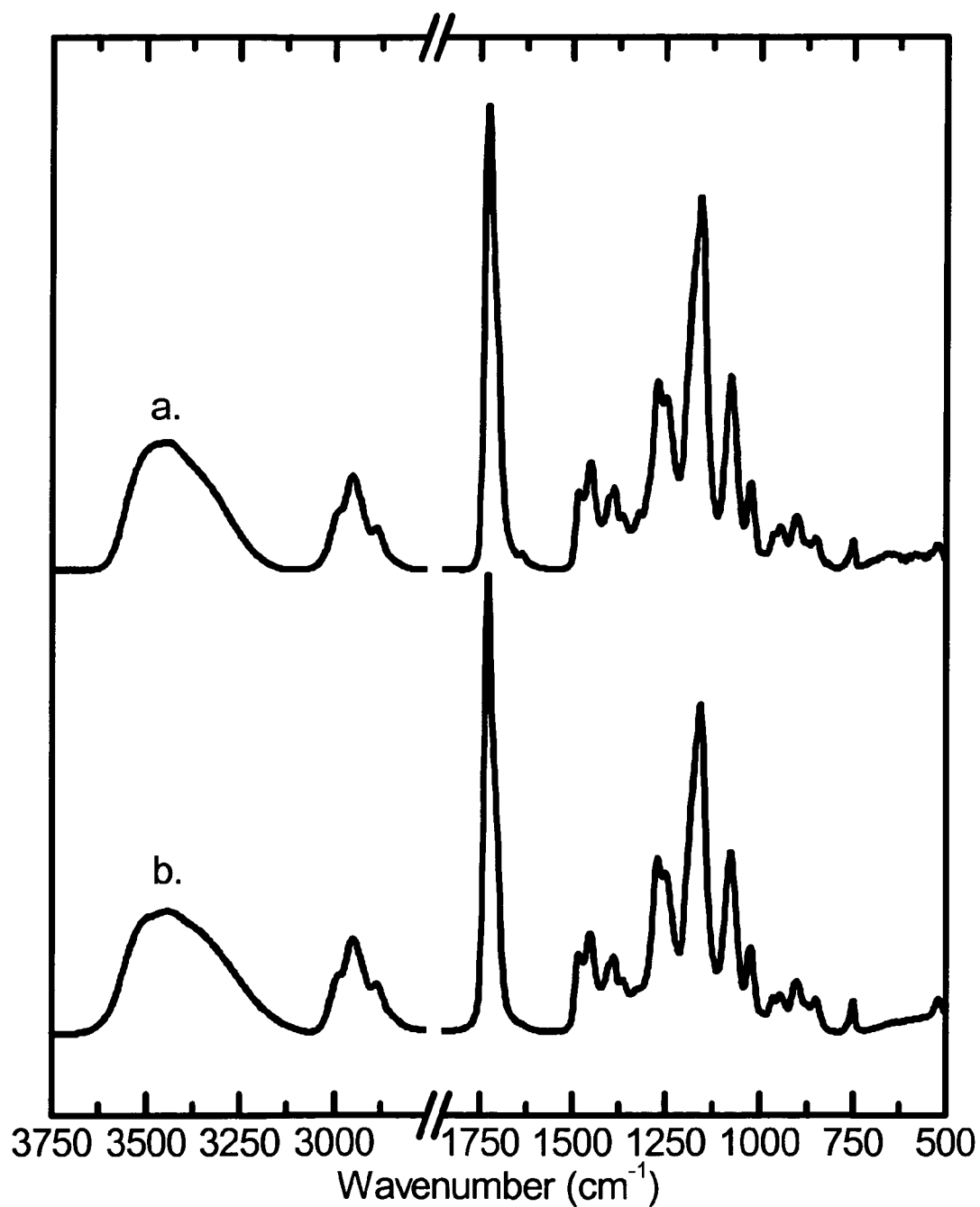
FIG. 2 depicts FTIR absorbance spectra of (a) PHEMA film synthesized from iCVD (Sample L3) and (b) spin-cast PHEMA standard obtained from Aldrich. The wide band centered at ~3450 $cm^{-1}$ indicates the retention of hydroxyl groups in the iCVD process. Baseline correction and thickness normalization were the only processing done on these spectra.

Fourier-Transform Infrared Spectroscopy. FIG. 2 shows the FTIR spectra of Sample L3 and the conventionally-polymerized PHEMA standard obtained from Aldrich. The FTIR spectra of the other four linear samples are similar to that of Sample L3. As seen from the figure, the spectrum of the iCVD film is essentially identical to that of the PHEMA standard. These spectra were thickness-normalized and baseline-corrected, and no other processing was performed. There are five main vibrational modes: O—H stretching (3700-3050 cm$^{-1}$), C—H stretching (3050-2700 cm$^{-1}$), C=O stretching (1750-1690 cm$^{-1}$), C—H bending (1500-1350 cm$^{-1}$), and C—O stretching (1300-1200 cm$^{-1}$). These assignments are based on the FTIR analyses of poly(methyl methacrylate) and PHEMA samples in the literature (Nagai, H. *J. Appl. Polym. Sci.* 1963, 7, 1697; and Perova, T. S.; Vij, J. K.; Xu, H. *Colloid Polym. Sci.* 1997, 275, 323). The broad peak centered at ~3450 cm$^{-1}$ clearly signifies the retention of the hydroxyl group, and the retention of the carbonyl group is evident in the presence of the strong peak centered at 1727 cm$^{-1}$. These results indicate that the entire pendant group, —COOCH$_2$CH$_2$OH, is conserved in the iCVD process. The high resemblance in the C—H stretching and bending regions between the two spectra also precludes loss of the α-methyl group. All the peaks in the iCVD spectrum exemplify no broadening compared to the PHEMA standard spectrum. The lack of broadening further affirms the retention of functionalities in the iCVD process, as such an effect would indicate loss of homogeneity in bonding environments—a consequence of loss of functional groups (Cox, J. N. In *Encyclopedia of Materials Characterization: Surfaces, Interfaces, Thin Films*; Brundle, C. R., Evans, C. A., Wilson, S., Eds.; Butterworth-Heinemann: Stoneham, Mass., 1992; p 422).

X-Ray Photoelectron Spectroscopy. XPS survey scans of Sample L3 and the PHEMA standard revealed carbon-to-oxygen (C/O) ratios of 68.9:31.1 and 68.8:31.2, respectively. The discrepancy between the ratio of the PHEMA standard and the theoretical ratio, 66.7:33.3, can be attributed to the inaccuracies of the relative sensitivity factors (RSF) used to calculate the atomic percentages. The RSFs used are 0.780 and 0.278 for O 1s and C 1s core levels, respectively. It is known that RSFs vary from material to material, so it is more common to compare compositions of closely related samples than to use absolute compositions (Brundle, C. R. In *Encyclopedia of Materials Characterization: Surfaces, Interfaces, Thin Films*; Brundle, C. R., Evans, C. A., Wilson, S., Eds.; Butterworth-Heinemann: Stoneham, Mass., 1992; p 287). Indeed, the C/O ratios of the iCVD sample and the PHEMA standard are so close that one can conclude that they have the same atomic compositions. The XPS high resolution scans show five carbon and three oxygen moieties, consistent with the structure of PHEMA (FIG. 1). Table 1 shows excellent agreement of both the binding energies and peak area ratios of the iCVD sample with previously-reported results for conventionally-polymerized PHEMA (Beamson, G.; Briggs, D. *High Resolution XPS of Organic Polymers: the Scienta ESCA300 Database*; Wiley: Chichester, West Sussex, England, 1992). The XPS results corroborate the FTIR results and support the hypothesis that iCVD produces PHEMA thin films that have the same linear structure as conventionally-polymerized PHEMA and have practically all of the functionalities retained. The linearity of the chains is further proven by that fact that iCVD PHEMA thin films are completely soluble in N,N-dimethylformamide, a common solvent used for gel permeation chromatography of PHEMA.

TABLE 1

High-Resolution XPS Scan Data of the iCVD PHEMA film (Sample L3). The literature values are from Beamson, G.; Briggs, D. High Resolution XPS of Organic Polymers: the Scienta ESCA300 Database; Wiley: Chichester, West Sussex, England, 1992.

| core level | peak | origin | iCVD film binding energy (eV) | area (%) | PHEMA reference binding energy (eV) | area (%) |
|---|---|---|---|---|---|---|
| C 1s | 1 | —C*H$_3$, —C—C*H$_2$—C— | 285.00 | 34 | 285.00 | 34 |
|  | 2 | —C*(CH$_3$)—CO— | 285.66 | 16 | 285.73 | 17 |
|  | 3 | —CH$_2$—C*H$_2$—OH | 286.61 | 17 | 286.53 | 17 |
|  | 4 | —O—C*H$_2$—CH$_2$— | 286.94 | 16 | 286.89 | 17 |
|  | 5 | —C*=O | 289.09 | 17 | 289.10 | 15 |
| O 1s | 1 | —C=O* | 532.32 | 33 | 532.32 | 33 |
|  | 2 | —O*H | 533.11 | 34 | 533.09 | 33 |
|  | 3 | —CO—O*—CH$_2$— | 533.80 | 33 | 533.86 | 33 |

Figure 3:
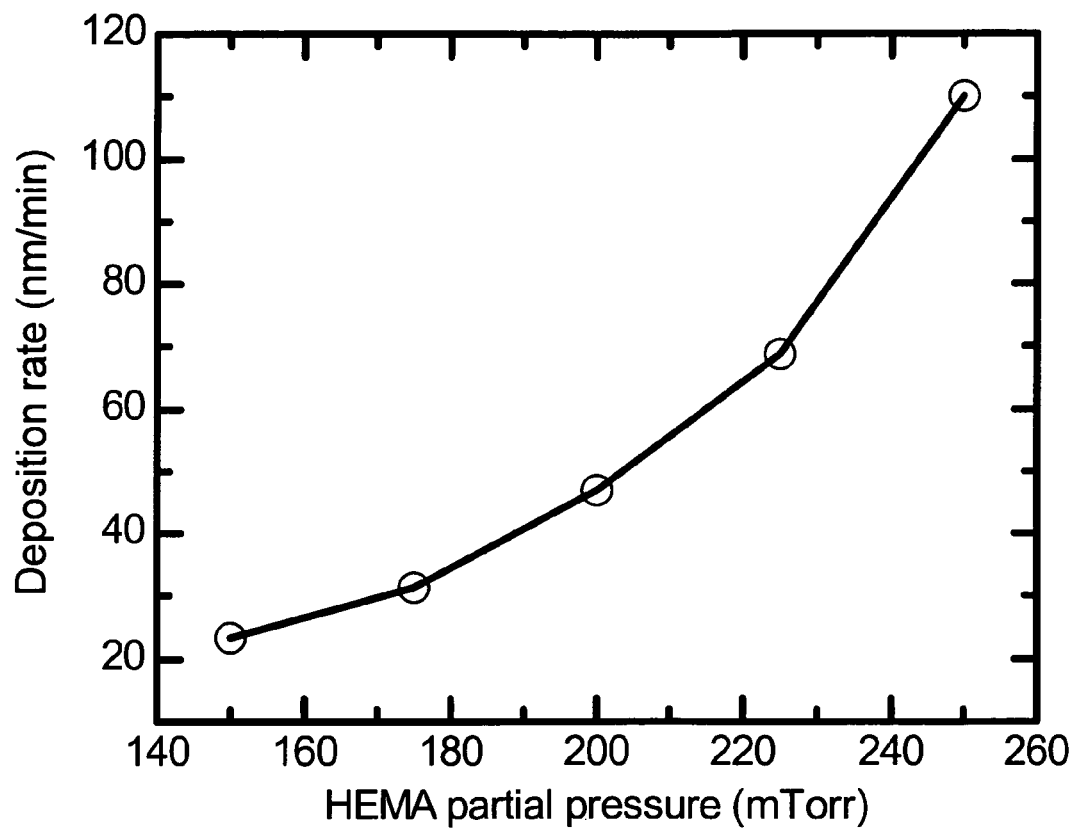
FIG. 3 depicts a graph showing deposition rate as a function of partial pressure of HEMA in the chemical vapor deposition reactor. The nonlinearity may be due to multilayer adsorption of HEMA on the surface and/or primary termination of chains.

Deposition Rate. The maximum deposition rate achieved in this study was 110 nm/min (Sample L5). This rate is significantly higher than the rate of 13.4 nm/min reported for the PECVD of PHEMA (Tarducci, C.; Schofield, W. C. E.; Badyal, J. P. S. Chem. Mat. 2002, 14, 2541). FIG. 3 shows the deposition rate of the linear iCVD films as a function of the partial pressure of HEMA in the vacuum chemical vapor deposition reactor holding residence time and total pressure fixed. As can be seen, the deposition rate increases nonlinearly with increasing partial pressure (i.e., gas-phase monomer concentration) and a nonlinear regression to a power law results in an exponent of 3.50±0.30. However, in the case of conventional solution-phase free-radical polymerization, the rate, of propagation is linear in monomer concentration (Odian, G. G. Principles of Polymerization, 3rd ed.; Wiley: New York, 1991; Rodriguez, F. Principles of Polymer Systems, 4th ed.; Taylor & Francis: Washington, D.C., 1996; and Kumar, A. S.; Gupta, R. K. Fundamentals of Polymers; McGraw-Hill: New York, 1998). The observed nonlinear behavior has two likely origins, multilayer adsorption and primary radical termination. While one of these two effects may dominate, their effects can also be multiplicative.

In the case of surface polymerization, the surface concentration of monomer can be anticipated to depend nonlinearly on the gas phase concentration. The nonlinear relationship between surface and gas phase concentration is often seen in multilayered adsorption (Masel, R. I. Principles of Adsorption and Reaction on Solid Surfaces; Wiley: New York, 1996). For a related monomer methyl methacrylate (MMA), Tsao and Ehrlich studied the surface photopolymerization and employed a quartz-crystal microbalance to study the coverage of MMA on a substrate as a function of MMA partial pressure (Tsao, J. Y.; Ehrlich, D. J. Appl. Phys. Lett. 1983, 42, 997). In their study, the MMA adlayer thickness, or effectively the MMA concentration on the surface, was nonlinear in MMA partial pressure. Multilayer adsorption was observed at partial pressures exceeding 30% of the saturation pressure of the monomer and adlayer thicknesses of more than 20 monolayers were observed at high partial pressures. In the current work, the highest partial pressure used in FIG. 3 (250 mTorr) is 72% of the estimated saturation pressure of HEMA at 35° C. (345 mTorr). Additionally, the hydrogen bonding among HEMA molecules would be expected to promote the ease of multilayer adsorption.

It can also be argued that the surface concentration is linear to the monomer partial pressure but the rate is nonlinear to the surface concentration. This kind of nonlinearity may be due to primary termination. Primary termination differs from normal termination on that the growing polymer chains are not terminated by coupling or disproportionating with each other but are so by coupling with initiating radicals. This behavior can occur when the concentration of the growing chains are low compared to that of the initiating radicals or when the growing chains are not sufficiently mobile to engage in a termination event. When primary termination is the dominating termination mechanism, the rate of polymerization is no longer linear but to the square of the monomer concentration (Odian, G. G. Principles of Polymerization, 3rd ed.; Wiley: New York, 1991). The deviation from a power of 2 in this work could be due to experimental errors, but the immobility argument could very well be true considering that the chains are not as mobile on the surface as they would be in solution-phase polymerization.

The overall effect could also be a combination of the two nonlinearities described above. Control of surface concentration not only allows control of growth rate also permit control of molecular weight. The molecular weight depends strongly on monomer concentration in solution-phase free-radical polymerization.

iCVD of Crosslinked Poly(2-hydroxyethyl methacrylate)

Figure 4:
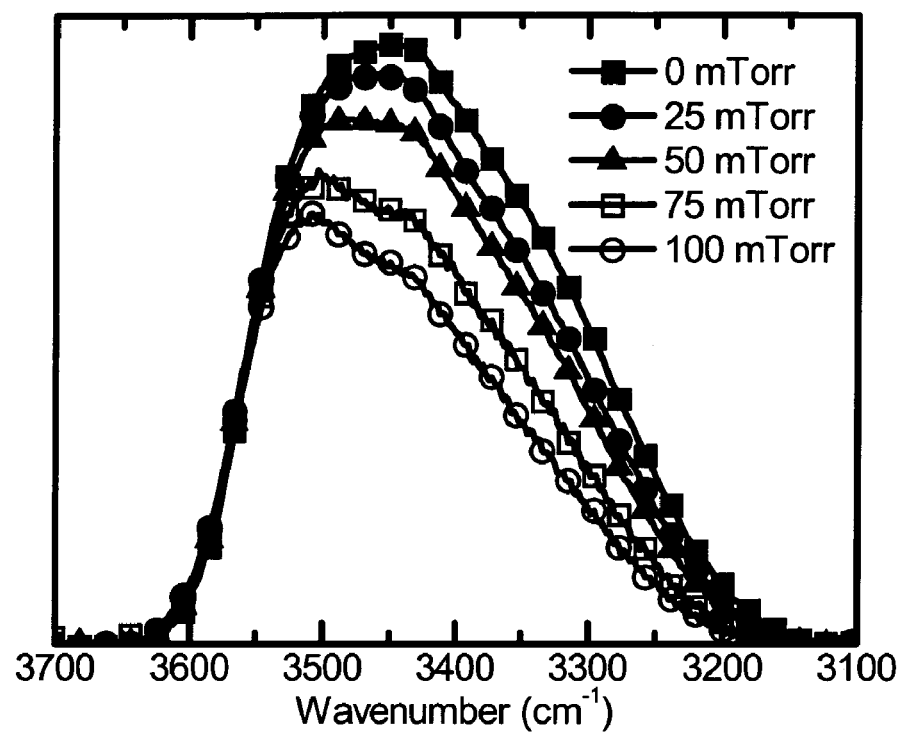
FIG. 4 depicts FTIR spectra of hydroxyl (top) and carbonyl stretching (bottom) absorbances normalized for film thickness as a function of the partial pressure of HEMA in the chemical vapor deposition reactor. The hydroxyl intensity decreases and the carbonyl intensity increases with increasing EGDA partial pressure.
Figure 4:
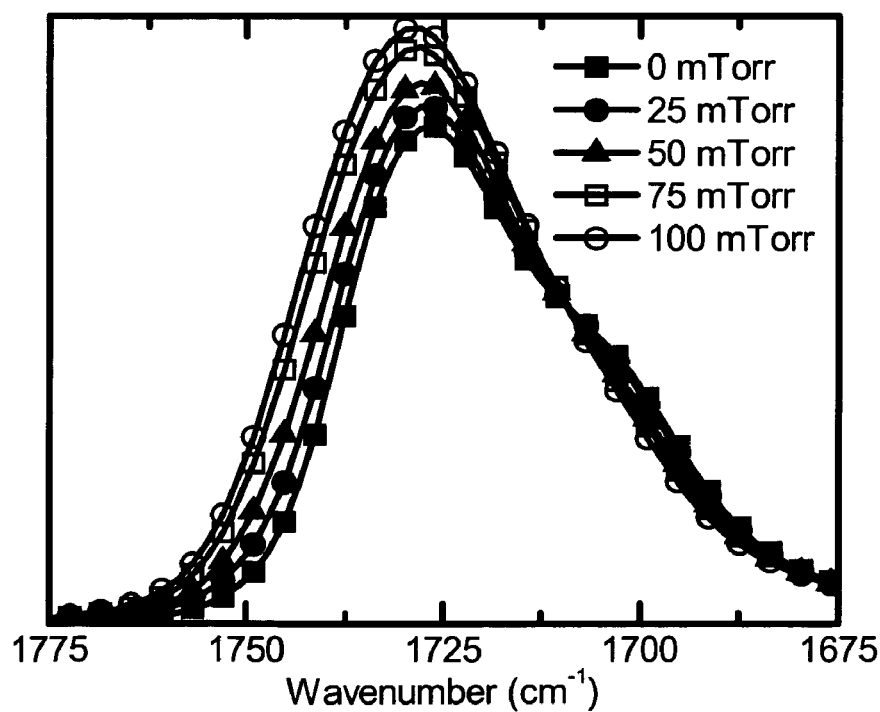

Fourier-Transform Infrared Spectroscopy. In order to synthesize crosslinked PHEMA films, EGDA was introduced together with HEMA into the vacuum chemical vapor deposition reactor in a second series of experiments (X1 through X5 in Table 3), in which the EGDA partial pressure was varied while holding the residence time and the pressure constant. EGDA is a divinyl compound and is a common crosslinking agent used in solution-phase polymerization. FIG. 4 shows the detailed FTIR analyses in the hydroxyl and the carbonyl stretching regions as the EGDA partial pressure is incremented. The intensities in the plots are normalized to a thickness of 1 µm. The O—H stretching intensity decreases and the C=O stretching intensity increases as the EGDA partial pressure increases. These trends are anticipated because EGDA does not contain any hydroxyl groups and has a higher density of carbonyl group per atom in the molecule.

According to the Beer-Lambert equation, the absorbance of a mode is proportional to the concentration of the moiety that is responsible for that particular mode, assuming that the bond oscillator strength is the same for each film. With this latter assumption, the areas under the peaks in FIG. 4 are proportional to concentrations of O—H and C=O groups in the films. These concentrations in turn can be used to calculate the crosslink densities of these films. The underlying assumption in the calculations of this section is that the C=O bond oscillator strengths of HEMA and EGDA units are identical. Stretching of a chemical bond, however, often exhibits different intensities depending on its bonding environment, so these FTIR results will also be compared to XPS data in the next section.

The calculation starts with the computation of the ratio (denoted r in Equation 1) of the peak area of the C=O stretching region to that of the O—H region in a linear PHEMA film that contains only HEMA units. Using this ratio of 0.59, the corresponding C=O intensity contributed by the HEMA units can be computed with the area under the O—H peak, $A_{O-H}$. The net intensity contributed by the EGDA units is then the total C=O intensity, $A_{C=O}$, less the contribution from the HEMA units, $rA_{O-H}$. Noting that each EGDA unit contains two C=O bonds, a ratio between the concentrations of EGDA and HEMA units can then be calculated (Equation 1) and serves as an indication of the degree of crosslinking.

$$\frac{[EGDA]}{[HEMA]} = \frac{(A_{C=O} - rA_{O-H})/2}{rA_{O-H}} \quad (1)$$

Figure 6:
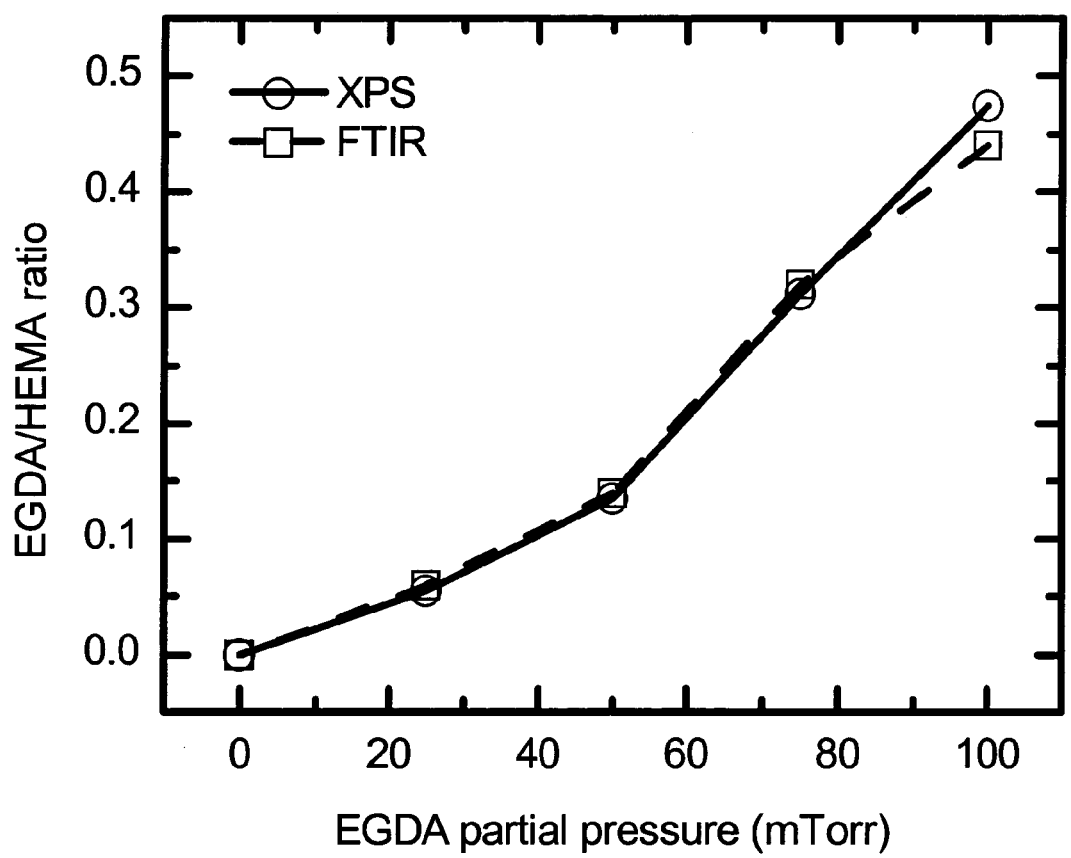
FIG. 6 depicts a graph of the EGDA/HEMA ratio in iCVD films as a function of the partial pressure of EGDA in the chemical vapor deposition reactor. More EGDA units are incorporated as the EGDA partial pressure increases.

FIG. 6 shows the EGDA/HEMA ratio in the film as a function of the EGDA partial pressure. The incorporation of EGDA increases with increasing EGDA partial pressure. This result is anticipated, as the concentration of an adsorbed species on the surface increases with increasing partial pressure.

Figure 5:
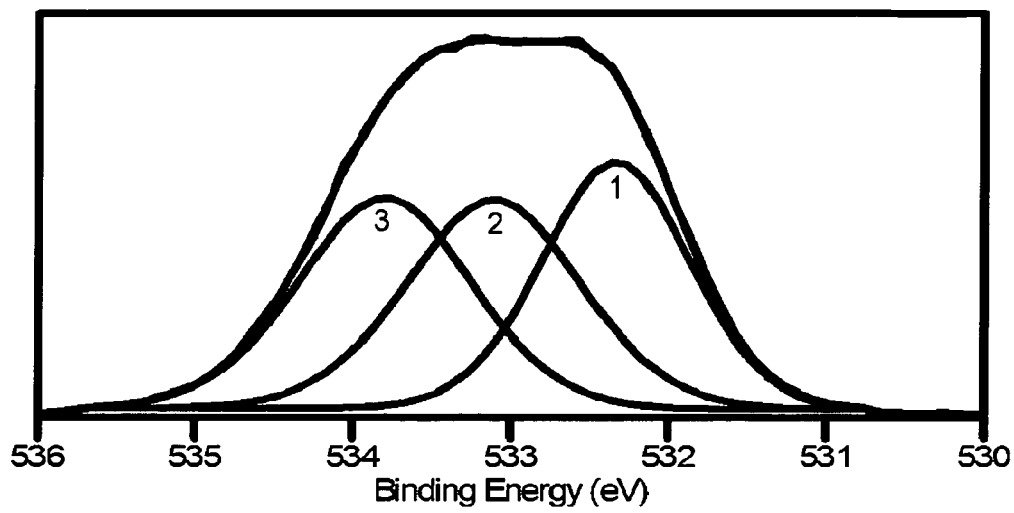
FIG. 5 depicts XPS high resolution scans of (a) the homopolymer film, Sample X1, and (b) a crosslinked film, Sample X5. The intensity of Peak 2, that refers to the O*—H oxygen, decreases with increasing degree of crosslinking.
Figure 5:
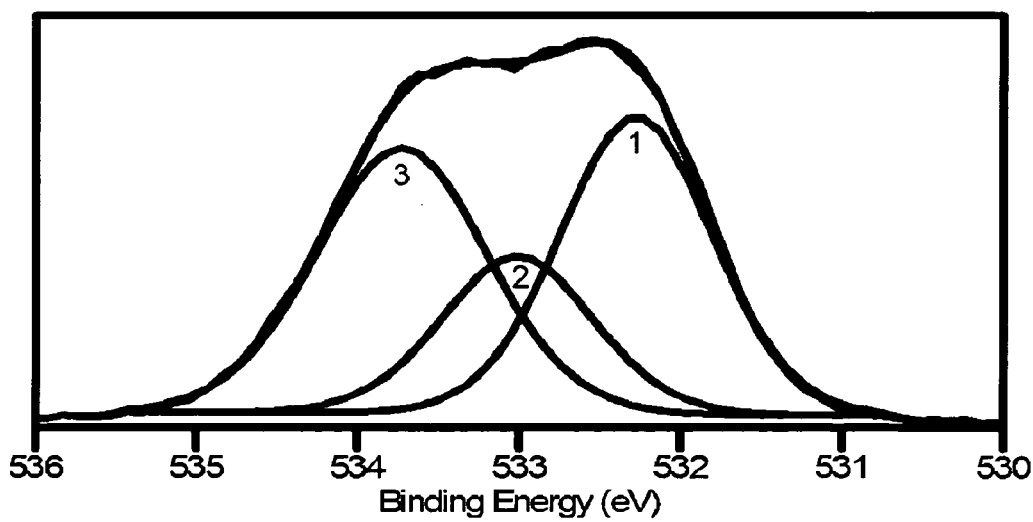

X-Ray Photoelectron Spectroscopy. XPS high-resolution scan in the oxygen region was also used to determine the crosslink densities in the films. As seen from FIG. 1, HEMA units have three different oxygen moieties, but EGDA units have only two. The binding energies of the photoelectrons of the C=O* oxygen (~532.3 eV) and the OC—O* oxygen (~533.8 eV) should be the same in both the HEMA and EGDA units. The asterisk denotes the atom with which the binding energy is associated. However, only the HEMA units contain the O*—H oxygen (~533.1 eV). FIG. 5 compares the XPS high resolution scans of the homopolymer (X1) and the most crosslinked (X5) films. In accordance with the FTIR results, the O*—H intensity (Peak 2) relative to the C=O* intensity (Peak 1) decreases with increasing EGDA partial pressure. The C=O* peak area is approximately the same as the OC—O* peak area (Peak 3) in all the films because these moieties are present in a 1:1 ratio in both HEMA and EGDA. It should be noted that the peak positions in FIG. 5 are in close agreement with the literature values listed in Table 1. The contributions of HEMA and EGDA units to the C=O* intensity can be decoupled using the same logic as discussed in the FTIR section using Equation 2. Unlike Equation 1, Equation 2 does not require the use of a ratio because XPS measures directly the atomic contributions.

$$\frac{[EGDA]}{[HEMA]} = \frac{(A_{C=O*} - A_{O*-H})/2}{A_{O*-H}} \quad (2)$$

FIG. 6 shows the crosslink density as a function of EGDA partial pressure based on the XPS data. The XPS results agree very well with the FTIR results, affirming the validity of the calculated crosslink densities. It can also be inferred from the good agreement of the two sets of results that the C=O stretching in the HEMA units and that in the EGDA units have similar bond oscillator strengths, simplifying the calculation of the crosslink densities via the FTIR method.

Both the FTIR and the XPS results (FIG. 6) show that the degree of crosslinking of an iCVD thin-film PHEMA hydrogel can be tuned between EGDA/HEMA ratios of 0.00 and ~0.46 by controlling the partial pressure of the crosslinking agent in the vacuum chemical vapor deposition reactor. Plasma polymers are often intrinsically crosslinked without the use of a crosslinking agent. The degree of crosslinking can be controlled via pulsation or regulation of plasma power, but the deposition rate and the degree of retention of functionalities are simultaneously altered (Tarducci, C.; Schofield, W. C. E.; Badyal, J. P. S. Chem. Mat. 2002, 14, 2541). iCVD provides excellent retention of functionalities and allows independent control of crosslink density. The dependence of deposition rate on the partial pressure of EGDA has not been investigated, but the introduction of a crosslinking agent does not need modification of the partial pressure of HEMA or the residence time of species in the chemical vapor deposition reactor. The growth rate is expected to remain high as long as the partial pressure of HEMA remains high. Although not explored in depth, the growth rates of crosslinked PHEMA films, grown at a 200 mTorr HEMA partial pressure, were on par with the rate recorded for the linear PHEMA deposition at the same partial pressure (~45 nm/min as seen in FIG. 3).

Figure 7:
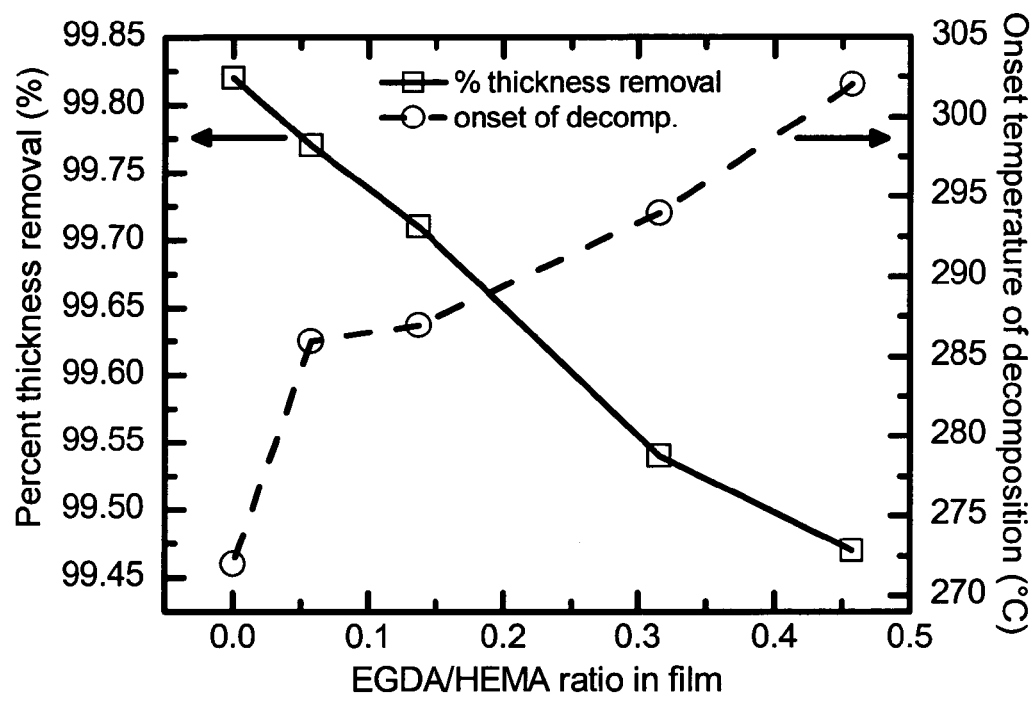
FIG. 7 depicts graphs of percent thickness removal and onset temperature of decomposition as a function of EGDA/HEMA ratio in iCVD film.

Thermal Properties. The effect of crosslinking on the thermal stability of the crosslinked PHEMA thin films is shown in FIG. 7. The percent thickness removal decreases and the onset temperature of decomposition can be observed to increase with increasing crosslink density. The EGDA/HEMA ratios in this and subsequent figures are mean values of the results derived from the FTIR and the XPS analyses. It is interesting to note the cleanliness of the decomposition even for the most crosslinked film. In fact, all the films had residue thicknesses of less than 0.01 μm (initial thicknesses >1.3 μm). The non-crosslinked PHEMA film, grown at 0 mTorr EGDA partial pressure, had a 99.82% thickness loss. One previously reported percent degradation was 98% by weight, based on thermogravimetric analysis, for solution-polymerized PHEMA when the temperature was raised to 450° C. (Demirelli, K.; Coskun, M.; Kaya, E. Polym. Degrad. Stabil. 2001, 72, 75; and Demirelli, K.; Coskun, M. F.; Kaya, E.; Coskun, M. Polym. Degrad. Stabil. 2002, 78, 333.) The difference between the results could be due to the bases of measurements (thickness vs. weight) and/or the difference in heating rates. One other possibility is that, in a thin-film setting, the degradation products are able to diffuse away quickly without being trapped inside the film and engaging in undesired chemical reactions. As seen in FIG. 7, the crosslinked PHEMA films also degraded very cleanly.

The decomposition of crosslinked PHEMA has not been studied extensively. In a previous study of crosslinked PMMA using ethylene glycol dimethacrylate, the amount of residue was found not to be a strong function of crosslink density (note the highly magnified y-axis), in line with the results in FIG. 7, but the onset temperature of decomposition was found to decrease with increasing crosslink density, opposite to the trend in FIG. 7 (Levchik, G. F.; Si, K.; Levchik, S. V.; Camino, G.; Wilkie, C. A. Polym. Degrad. Stabil. 1999, 65, 395). It is believed that the conflicting results are due to the difference in the nature of the crosslinking agents, one being a diacrylate and the other being a dimethacrylate. A study on the thermal decomposition of copolymers of HEMA and other acrylic and methacrylic monomers has shown that the thermal stability increases with increasing acrylic content but decreases with increasing methacrylic content (Varma, I. K.; Patnaik, S. J. Polym. Sci.

Pol. Chem. 1979, 17, 3279). For instance, the thermal stability of HEMA-methyl acrylate (MA) increases with increasing MA content, whereas that of HEMA-MMA decreases with increasing MMA content. When the bond between two methacrylic repeat units is broken, one tertiary radical and one primary radical are formed. When, however, the bond between an acrylic unit and a methacrylic unit is broken, one secondary radical and one primary radical are formed. Tertiary radicals are more stable than secondary ones, so it is easier to break a HEMA-HEMA bond than a HEMA-EGDA bond. This logic is true even when the bond being broken is a head-to-head linkage. The interpretation here can explain the trend seen in FIG. 7. As the acrylic content increases, the average strength of bonds within the polymer is higher and thus explains the increase in the onset temperature. The slight increase in the amount of residue with increasing crosslink density can be explained by the fact that polyacrylates decompose less cleanly than polymethacrylates (Ali, A. H.; Srinivasan, K. S. V. *J. Macromol. Sci.-Pure Appl. Chem.* 1997, A34, 235). A different study on the thermal degradation of copolymers of HEMA and tert-butyl acrylate also shows that the amount of residue increases with increasing acrylic content (Martinez, G.; Sanchez-Chaves, M.; Rocha, C. M.; Ellis, G. *Polym. Degrad. Stabil.* 2002, 76, 205).

The thermal analyses of iCVD PHEMA films show that the films are of high thermal stabilities and are suitable for use in high-temperature applications. On the other hand, the films may be used as potential sacrificial materials because of the minuscule amounts of residues remaining after decomposition. Crosslinking does not cause an appreciable increase in the amount of residue but should enhance the mechanical properties of the films. Sacrificial materials are commonly used in the fabrication of microelectromechanical systems (MEMS), in which there are stringent requirements for thermal stability and mechanical properties (Senturia, S. D. *Microsystem Design*; Kluwer Academic Publishers: Boston, Mass., 2001).

Figure 8:
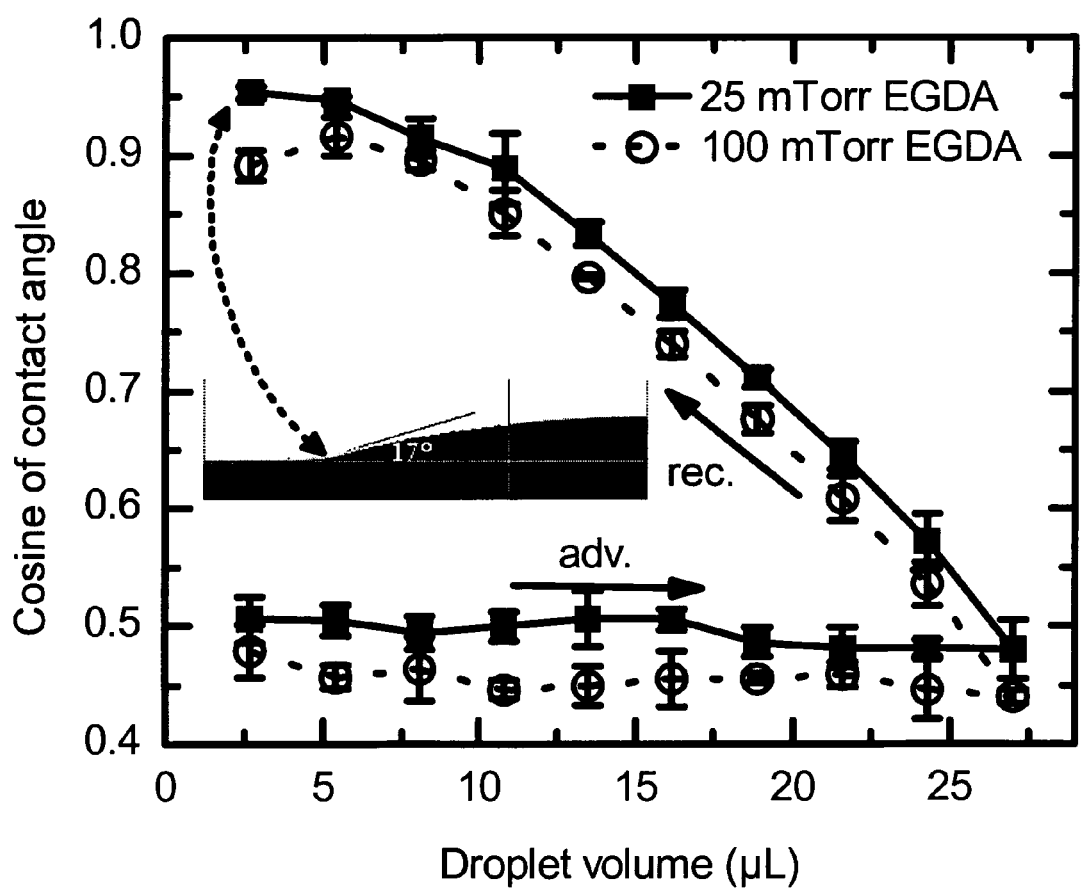
FIG. 8 depicts advancing and receding contact angles as functions of the droplet volume. The film with more incorporation of EGDA has higher advancing and receding angles. The inset picture depicts the receding contact angle of 17° at the end of the advancing/receding cycle (ultimate receding angle) measured on Sample X2.

Contact-Angle Measurements. PHEMA is hydrophilic because of its hydroxyl functionality. Contact-angle measurements were performed to test the hydrophilicity of the PHEMA thin films synthesized by iCVD. Sessile droplet (advancing and receding) contact angles were measured as a function of the water droplet volume. In each of the cases including non-crosslinked and crosslinked PHEMA films, the advancing angle reached a constant value as the water droplet volume increased, but the receding angle decreased gradually as the droplet volume decreased. The decrease is due to the fact that the contact area did not change even though the volume was decreasing. The three phase (air-water-polymer) contact line virtually did not recede. FIG. 8 shows the measurements of two of the crosslinked films made at different EGDA partial pressures. In each of the measurements, the advancing angle is relatively constant as the droplet volume increases, but the receding angle decreases as the volume decreases. Also, the advancing angle is much larger than the receding angle. This effect is known as contact-angle hysteresis. Yasuda et al. performed contact-angle measurements on gelatin and agar gels and observed the same advancing and receding trends (Yasuda, T.; Okuno, T.; Yasuda, H. *Langmuir* 1994, 10, 2435). They attributed the effect to surface-configuration change and surface-state equilibration.

The surface state of a polymer equilibrates with the surrounding medium (Morra, M.; Occhiello, E.; Garbassi, F. *J. Colloid Interface Sci.* 1992, 149, 84; and Holly, F. J.; Refojo, M. F. *J. Biomed. Mater. Res.* 1975, 9, 315.) When the medium is changed, the surface state of the polymer will begin to establish a new equilibrium with the new medium. When a polymer is exposed to a dry atmosphere, the surface configuration will progressively change, if allowed, to a more hydrophobic state. When the surrounding medium is changed from a dry atmosphere to a wet one, e.g., water, the surface configuration will become increasingly hydrophilic. It has been discussed that, when PHEMA is exposed to air, the hydrophobic methyl groups become directed toward air at the interface by chain rotation (Tonge, S.; Jones, L.; Goodall, S.; Tighe, B. *Curr. Eye Res.* 2001, 23, 51). When PHEMA is in contact with water, it reorients its hydrophilic groups toward water. Therefore, the contact angles measured depend very much on the medium to which the polymer has been exposed. This surface-configuration concept can explain the observed hysteresis for the iCVD PHEMA films. The advancing angles are high because the surface has been in equilibrium with air and thus appears hydrophobic. Once the surface has been soaked in water, the PHEMA chains on the surface reconfigure themselves so that the surface becomes hydrophilic. The increase in hydrophilicity explains the decrease in the receding angle and why the three phase contact line does not recede. The contact angle of the reconfigured surface has become much lower than the advancing angle. When water is withdrawn from the surface, the three phase contact line needs not recede because the angle is still higher than what the contact angle should be. As a result, the water withdrawal causes mere flattening of the droplet until the true contact angle is reached. Since the contact area stays the same but the volume has decreased, the droplet is bound to flatten, leading to a decreased contact angle. On the other hand, the advancing angle does not change with droplet volume because the polymer-air interface beside the droplet has not yet been in contact with water and is hydrophobic. FIG. 8 shows that the more crosslinked film has higher advancing and receding angles. The last receding angle measurement, hereby referred to as the ultimate receding angle, is representative of how hydrophilic the surface is after equilibration with water. Table 2 summarizes the advancing and the ultimate receding angles of films with different crosslink densities (Samples X1 to X5). These angles are results of the advancing/receding cycle, as represented by FIG. 8. Both angles increase with increasing crosslink density. The increase in the EGDA content causes a decrease in hydrophilicity because the hydroxyl content is decreased. The ultimate receding angle of the non-crosslinked film, 17°, is in line with the value reported for the plasma PHEMA film (Tarducci, C.; Schofield, W. C. E.; Badyal, J. P. S. *Chem. Mat.* 2002, 14, 2541). It should be noted there was little if any time dependency on these contact-angle measurements. Measurements that were a month apart agreed well with each other. Unlike plasma films, which contain dangling bonds leading to change of contact angles over time, iCVD films do not exhibit such a change, which suggests that few if any dangling bonds exist and corroborates the free-radical mechanism involving the annihilation of radicals by termination (Gengenbach, T. R.; Griesser, H. J. *Surf. Interface Anal.* 1998, 26, 498). The inset in FIG. 8 depicts half of the droplet at the end of the advancing-receding cycle on Sample X2. A hydrophilic surface coating of PHEMA can indeed be synthesized using the iCVD process. This result supports the FTIR and XPS results that the hydroxyl functionality is retained in the iCVD process.

TABLE 2

Summary of advancing and ultimate receding angles of sessile contact angle measurements on iCVD films

| Sample | EGDA partial pressure (mTorr) | EGDA/HEMA in film | advancing angle (°) | ultimate receding angle (°) |
|---|---|---|---|---|
| X1 | 0 | 0.00 | 37 | 17 |
| X2 | 25 | 0.06 | 49 | 17 |
| X3 | 50 | 0.14 | 50 | 22 |
| X4 | 75 | 0.32 | 54 | 28 |
| X5 | 100 | 0.46 | 54 | 30 |

Figure 9:
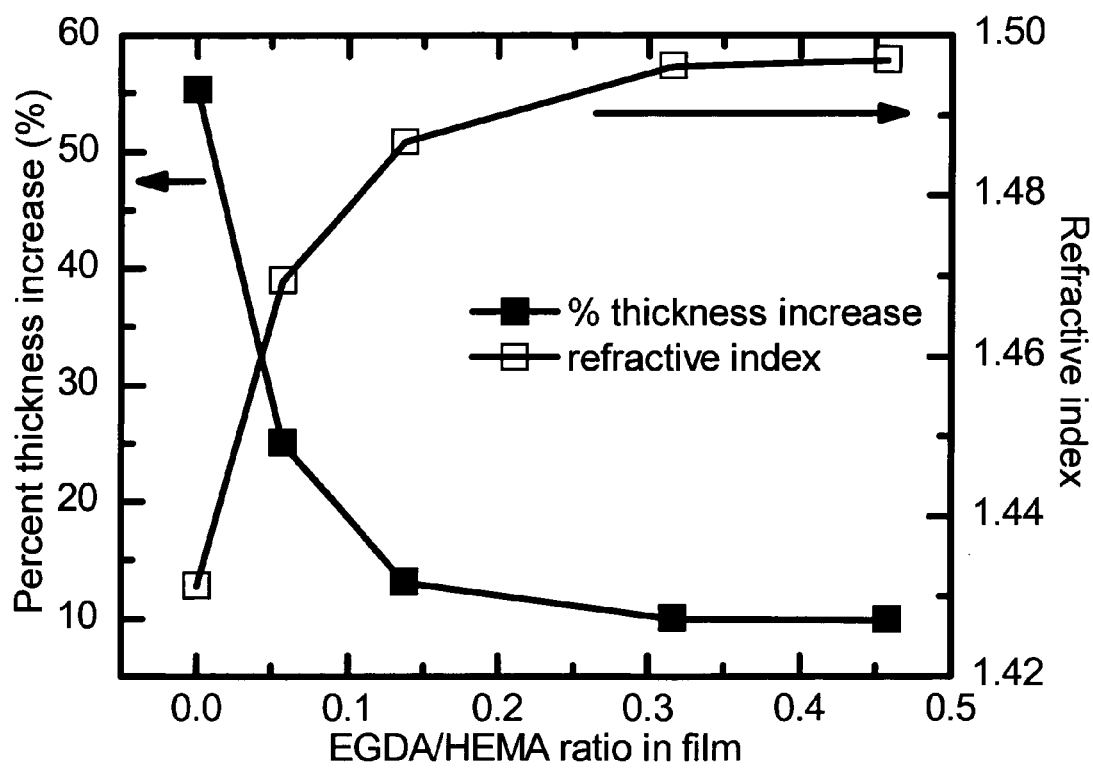
FIG. 9 depicts percentage changes in film thickness and the refractive index of swollen film as a function of the EGDA/HEMA ratio in the film.

Degree of Swelling and Water Content. Analyses of degree of swelling and water content of thin films using ellipsometry have been reported previously. A swollen hydrogel can be modeled as a composite material comprised of the polymer as the matrix and water as the filler. One method typically used for modeling composite materials is the effective medium approximation (EMA). The details of this method have been described elsewhere (Tang, Y.; Lu, J. R.; Lewis, A. L.; Vick, T. A.; Stratford, P. W. *Macromolecules* 2001, 34, 8768). FIG. 9 shows the thickness increase due to swelling and the refractive index of each of the swollen films (Samples X1-X5). The increase in the crosslink density limits the film's ability to swell, as the polymer chains are held together more tightly as the crosslink density increases. The linear polymer (Sample X1, EGDA/HEMA=0.0) has a thickness increase of 55%, while the most crosslinked one (Sample X5, EGDA/HEMA=4.6) has only a 10% increase. The fact that crosslinking hinders the ability to hold water is reflected in the refractive index measurements (FIG. 9), which show that the refractive index increases with increasing crosslink density. Water has a lower refractive index ($\eta_{633}$=1.33) than the polymer ($\eta_{633}$=1.49-1.51), so an increase in water content results in a lower index.

Figure 10:
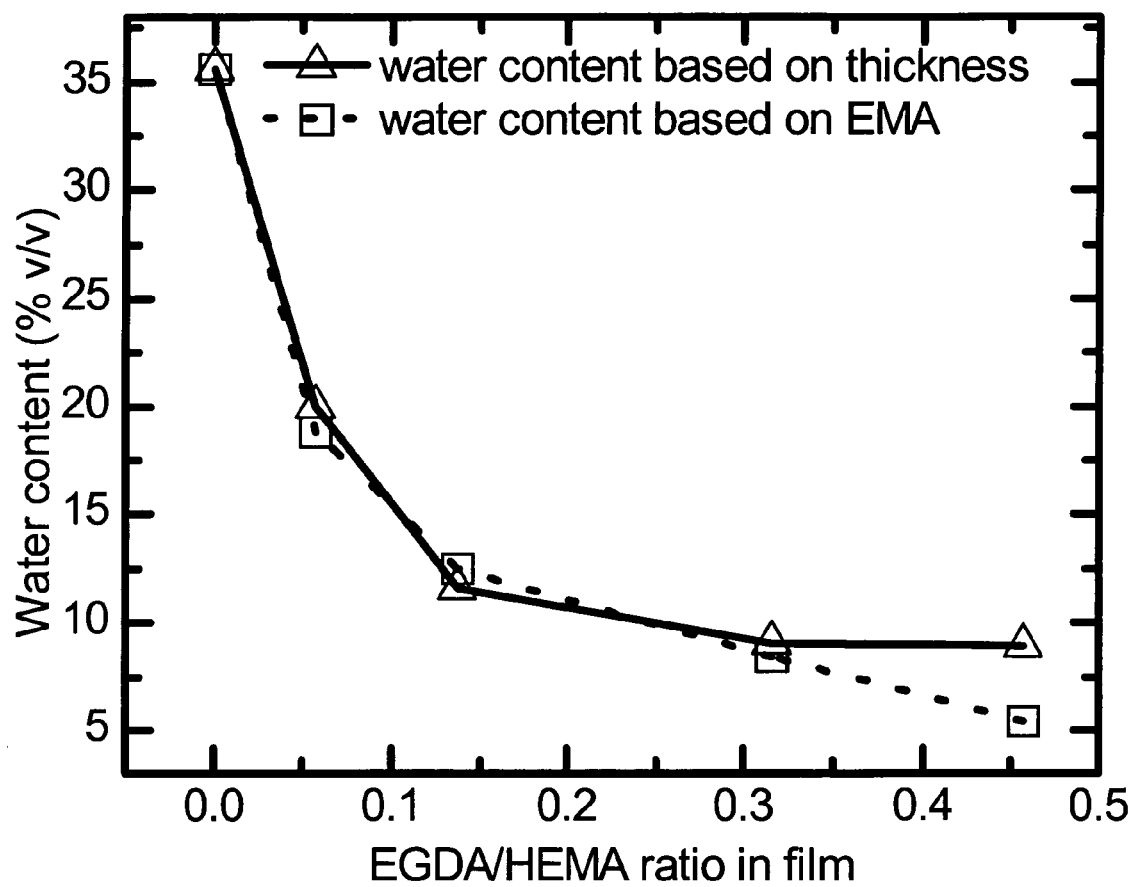
FIG. 10 depicts the water content of swollen film as a function of the EGDA/HEMA ratio in the film.

FIG. 10 gives the water contents of the thin-film hydrogels based on EMA and on thickness increase. The values based on thickness increase were calculated assuming that the films swell only in the direction normal to the substrate, whereas those EMA values were generated by obtaining the best fit of the ellipsometry data. As can be seen, the two sets of data match closely, suggesting that the films do swell predominantly in the normal direction. As the films are not free-standing but adhered to the underlying Si substrates, it is reasonable that the films tend to swell preferentially in the normal direction. A compressive stress would have to be overcome for the films to swell laterally. As expected, the water content decreases with increasing crosslink density. The linear polymer (Sample X1) has about 35% (v/v) water, in line with results in the literature for PHEMA (Hermitte, L.; Thomas, F.; Bougaran, R.; Martelet, C. *J. Colloid Interface Sci.* 2004, 272, 82; and Davis, T. P.; Huglin, M. B. *Angew. Makromol. Chem.* 1991, 189, 195). The strong uptake of water further corroborates the spectroscopic results and the contact-angle measurements that the hydrophilic pendant groups are retained in the iCVD process.

The results in this section show that the films produced using iCVD function as hydrogels when soaked in water. The ability of iCVD to control the crosslink density and thus the degree of swelling through adjustment of the partial pressure of the crosslinking agent in the gas phase is shown in FIGS. 9 and 10.

EXEMPLIFICATION

The invention will now be described more fully with reference to the accompanying examples, in which certain preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Example 1

Materials and Methods. Films were deposited on 100-mm-diameter silicon (Si) substrates in a custom-built vacuum reactor (Sharon Vacuum). The reactor was cylindrical with a height of 3.3 cm and a radius of 12 cm. The inlet of precursor gases and the exhaust were at opposite ends of the reactor. The top of the reactor was covered by a removable quartz plate (~15 cm radius and 2.5 cm thick), allowing visual inspection, laser interferometry and placement of substrate. The reactor was equipped with a filament array, which provided thermal energy for selective decomposition of molecules, and a back-side-cooled stage (35° C.) on which the substrate was placed. The clearance between the filaments and the stage was 29 mm. The Nichrome filaments (80% Ni/20% Cr, AWG 26, Omega Engineering) were resistively heated to 280° C., as measured by a thermocouple (Type K, AWG 36, Omega Engineering) directly attached to one of them. The reactor pressure was maintained at 350 mTorr with a throttling butterfly valve (Intellisys, Nor-Cal).

The monomer HEMA (99.0%+, Aldrich) and the crosslinking agent EGDA (90%, Aldrich) and the initiator TBPO (98%, Aldrich), were used without further purification. HEMA and EGDA liquids were vaporized in glass jars that were maintained at 70±1 and 65±1° C., respectively. HEMA and EGDA vapors were metered into the reactor through mass-flow controllers (Model 1152C, MKS). TBPO was maintained at room temperature in a glass jar, and its vapor was also metered into the reactor through a mass flow controller (Model 1479A, MKS). All vapors were mixed together before entering the reactor through a side port. Depositions were monitored using an interferometry system equipped with a 633-nm HeNe laser source (JDS Uniphase). The cycle thickness was calculated by dividing the actual thickness, as measured using variable-angle spectroscopic ellipsometry (VASE), by the number of interferometric cycles. VASE was performed on a J. A. Woollam M-2000 spectroscopic ellipsometer with a xenon light source. Data were acquired at three angles (65°, 70°, and 75°) and 225 wavelengths, and the Cauchy-Urbach model was used to fit the data.

Example 2a

Preparation of PHEMA-containing Films. Two series of films were prepared. For the homopolymer experiments (linear PHEMA, denoted L1 to L5 in Table 3), no EGDA was introduced into the reactor.

TABLE 3

Details of Experimental Runs (HEME/EGDA)

| Sample | Flow Rate (sccm) | | | | Partial Pressure (mTorr) | |
|---|---|---|---|---|---|---|
| | HEMA | EGDA | TBPO | N$_2$ | HEMA | EGDA |
| Linear Series | | | | | | |
| L1 | 3.0 | — | 1.0 | 3.0 | 150 | — |
| L2 | 3.5 | — | 1.0 | 2.5 | 175 | — |
| L3 | 4.0 | — | 1.0 | 2.0 | 200 | — |
| L4 | 4.5 | — | 1.0 | 1.5 | 225 | — |
| L5 | 5.0 | — | 1.0 | 1.0 | 250 | — |
| Cross-linked Series | | | | | | |
| X1 | 4.0 | 0.0 | 1.0 | 2.0 | 200 | 0 |
| X2 | 4.0 | 0.5 | 1.0 | 1.5 | 200 | 25 |
| X3 | 4.0 | 1.0 | 1.0 | 1.0 | 200 | 50 |
| X4 | 4.0 | 1.5 | 1.0 | 0.5 | 200 | 75 |
| X5 | 4.0 | 2.0 | 1.0 | 0.0 | 200 | 100 |

The flow rate of HEMA was varied between 3 and 5 sccm in increments of 0.5 sccm, whereas that of TBPO was kept constant at 1 sccm. A patch flow of nitrogen was also introduced into the reactor to keep the total flow rate at 7 sccm. This arrangement ensured the same residence time of 5 s for all experimental runs. For the crosslinking experiments (crosslinked PHEMA, denoted X1 through X5 in Table 3), both the flow rates of HEMA (4 sccm) and TBPO (1 sccm) were kept constant. A HEMA flow rate of 4 sccm was chosen because it was the midpoint of the linear series. The flow rate of EGDA was varied between 0 and 2 sccm in increments of 0.5 sccm. A patch flow of nitrogen was also used to maintain the total flow rate at 7 sccm. All runs were carried out to produce films with thicknesses of ~1.4 μm.

Example 2b

Preparation of PVP-containing Films. Two series of films were prepared. For the homopolymer experiments (linear PVP, denoted L6 to L10 in Table 4), no EGDA was introduced into the reactor.

TABLE 4

Details of Experimental Runs (VP/EGDA)

| Sample | Flow Rate (sccm) | | | | Partial Pressure (mTorr) | |
|---|---|---|---|---|---|---|
| | VP | EGDA | TBPO | N$_2$ | VP | EGDA |
| Linear Series (500 mTorr) | | | | | | |
| L6 | 7.0 | — | 1.0 | 2.0 | 350.0 | — |
| L7 | 6.5 | — | 1.0 | 2.5 | 325.0 | — |
| L8 | 6.0 | — | 1.0 | 3.0 | 300.0 | — |
| L9 | 5.5 | — | 1.0 | 3.5 | 275.0 | — |
| L10 | 5.0 | — | 1.0 | 4.0 | 250.0 | — |
| Cross-linked Series (420 mTorr) | | | | | | |
| X6 | 10.0 | 0.0 | 1.0 | 1.0 | 350.0 | 0.0 |
| X7 | 9.5 | 0.5 | 1.0 | 1.0 | 332.5 | 17.5 |
| X8 | 9.0 | 1.0 | 1.0 | 1.0 | 315.0 | 35.0 |
| X9 | 8.5 | 1.5 | 1.0 | 1.0 | 297.5 | 52.5 |
| X10 | 8.0 | 2.0 | 1.0 | 1.0 | 280.0 | 70.0 |

The flow rate of PVP was varied between 5 and 7 sccm in increments of 0.5 sccm, whereas that of TBPO was kept constant at 1 sccm. A patch flow of nitrogen was also introduced into the reactor to keep the total flow rate at 9 sccm. This arrangement ensured the same residence time for all experimental runs. For the crosslinking experiments (crosslinked PVP, denoted X6 through X10 in Table 4), flow rate of PVP was varied between 8 and 10 sccm in increments of 0.5 sccm, whereas that of TBPO was kept constant at 1 sccm. The flow rate of EGDA was varied between 0 and 2 sccm in increments of 0.5 sccm. FIGS. 12-21 relate to these films.

Example 3

Characterization of the Films. Fourier-transform infrared (FTIR) measurements were performed on a Nicolet Nexus 870 ESP spectrometer in normal transmission mode using a DTGS KBr detector over the range of 400 to 4000 cm$^{-1}$ at a 4-cm$^{-1}$ resolution averaged over 64 scans. All spectra were baseline corrected and normalized to a thickness of 1 μm. The polymer films were degassed overnight in a vacuum oven maintained at 60° C. before FTIR measurements were taken. X-ray photoelectron spectroscopy (XPS) was done on a Kratos Axis Ultra spectrometer equipped with a monochromatized Al Kα source. Contact-angle measurements were performed on a goniometer equipped with an automatic dispenser (Model 500, Ramé-Hart). Thermal properties were measured using the interferometry for thermal stability (ITS) apparatus described by Cruden et al.[44] The change in film thickness was monitored by noting the reflectance of a 633-nm HeNe laser beam off the substrate. All films used in the analyses had initial thicknesses of over 1.3 μm as measured with VASE. The onset temperature of decomposition was taken as the temperature at which the laser signal started to fluctuate. The samples were kept under a nitrogen atmosphere throughout the annealing. They were heated to 150° C. from room temperature in 10 min. and kept at 150° C. for 30 min. The temperature was then raised to 240° C. in 30 min. and kept constant for another 30 min. Finally, the temperature was raised to 430° C. over the course of 60 min. The samples were then kept at this temperature for 90 min. before being cooled to room temperature. Prior to the end of the 90-min. period, the laser signal of each of the films had become steady indicating no further thickness change. This ramp-and-soak temperature profile was to facilitate equilibration of temperature within the apparatus. VASE was performed before and after annealing for evaluations of thickness losses.

Example 4

Preparation of a "Wet" Comparison Film. As a comparison, a PHEMA standard (viscosity-average molecular weight ~300,000 g/mol) was obtained from Aldrich and was dissolved in N,N-dimethylformamide and cast onto a silicon substrate for FTIR and XPS analyses.

Example 5

Measuring Swelling Properties. A simple liquid cell was used for measurements of swelling properties. Each film-coated substrate was secured in the cell, and the cell was then placed on the stage of the M-2000 ellipsometer for measurements at a single angle of 75°, for which the cell was designed. Measurements were made before and after the cell was filled with water. The Cauchy-Urbach model was used to fit the data measured before filling, and the effective medium approximation (EMA) model, described elsewhere (Tang, Y.; Lu, J. R.; Lewis, A. L.; Vick, T. A.; Stratford, P. W. *Macromolecules* 2001, 34, 8768), was used to fit the data measured after filling, with water as the ambient material. The EMA model was comprised of two materials—the polymer matrix and water. The material file (i.e., refractive index vs. wavelength) for the polymer matrix was generated using the data measured before filling. The material file for water was obtained from J. A. Woollam.

INCORPORATION BY REFERENCE

All of the U.S. patents and U.S. published patent applications cited herein are hereby incorporated by reference.

EQUIVALENTS

Those skilled in the art will recognize, or be able to ascertain using no more than routine experimentation, many equivalents to the specific embodiments of the invention described herein. Such equivalents are intended to be encompassed by the following claims

We claim:

1. A method of forming a polymer coating on a surface of an article, comprising the steps of:
    placing said article on a stage in a chemical vapor deposition reactor; wherein said stage is optionally maintained at about a first temperature;
    mixing together a gaseous monomer at a first partial pressure, a gaseous initiator at a second partial pressure and, optionally, a gaseous crosslinker at a third partial pressure, thereby forming a reactive mixture; and
    contacting said surface of said article with said reactive mixture;
    wherein said gaseous initiator is selected from the group consisting of peroxides, hydroperoxides, and diazenes; said gaseous monomer is a compound of formula I; and said gaseous crosslinker is a compound of formula IV:

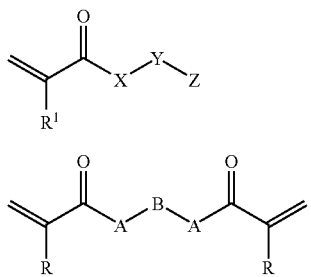

I

IV wherein, independently for each occurrence,
X is —C($R^2$)$_2$—, —O—, —S— or —N($R^2$)—;
A is —O—, —S— or —N($R^2$)—;
Y is —(C($R^2$)$_2$)$_n$—;
B is —C($R^2$)$_2$)$_m$—;
Z is $R^2$, $OR^2$, $SR^2$, or N($R^2$)$_2$;
R is —H, —CH$_3$, —CH$_2$CH$_3$, —CH$_2$CH$_2$CH$_3$, —CH(CH$_3$)$_2$, —C(CH)$_3$, —CH$_2$CH$_2$CH$_2$CH$_3$, —CH(CH$_3$)CH$_2$CH$_3$, or —CH$_2$CH(CH$_3$)$_2$;
$R^1$ is —H, —CH$_3$, —CH$_2$CH$_3$, —CH$_2$CH$_2$CH$_3$, —CH(CH$_3$)$_2$, —C(CH)$_3$, —CH$_2$CH$_2$CH$_2$CH$_3$, —CH(CH$_3$)CH$_2$CH$_3$, or —CH$_2$CH(CH$_3$)$_2$;

$R^2$ is —H, —CH$_3$, —CH$_2$CH$_3$, —CH$_2$CH$_2$CH$_3$, —CH(CH$_3$)$_2$, —C(CH)$_3$, —CH$_2$CH$_2$CH$_2$CH$_3$, —CH(CH$_3$)CH$_2$CH$_3$, —CH$_2$CH(CH$_3$)$_2$, cycloalkyl, aryl or aralkyl;
n is 0 to 6 inclusive; and
m is 1 to 6 inclusive.

2. The method of claim 1, wherein $R^1$ is —H or —CH$_3$.

3. The method of claim 1, wherein A is —O—; B is —CH$_2$CH$_2$—; and R is —H.

4. The method of claim 1, wherein X is —O—; Y is —(CH$_2$)$_n$—; Z is —OH; n is 2; and $R^1$ is —H.

5. The method of claim 1, wherein A is —O—; B is —CH$_2$CH$_2$—; R is —H; X is —O—; Y is —(CH$_2$)$_n$—; Z is —OH; n is 2; and $R^1$ is —H.

6. A method of forming a polymer coating on a surface of an article, comprising the steps of:
    placing said article on a stage in a chemical vapor deposition reactor; wherein said stage is optionally maintained at about a first temperature;
    mixing together a gaseous monomer at a first partial pressure, a gaseous initiator at a second partial pressure and, optionally, a gaseous crosslinker at a third partial pressure, thereby forming a reactive mixture; and
    contacting said surface of said article with said reactive mixture;
    wherein said gaseous initiator is selected from the group consisting of peroxides, hydroperoxides, and diazenes; said gaseous monomer is a compound of formula III; and said gaseous crosslinker is a compound of formula IV:

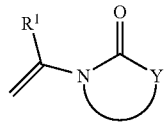

III

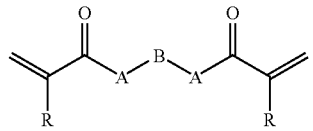

IV wherein, independently for each occurrence,
A is —C($R^2$)$_2$—, —O—, —S— or —N($R^2$)—;
Y is —(C($R^2$)$_2$)$_n$—;
B is —(C($R^2$)$_2$)$_m$—;
R is —H, —CH$_3$, —CH$_2$CH$_3$, —CH$_2$CH$_2$CH$_3$, —CH(CH$_3$)$_2$, —C(CH)$_3$, —CH$_2$CH$_2$CH$_2$CH$_3$; —CH(CH$_3$)CH$_2$CH$_3$, or —CH$_2$CH(CH$_3$)$_2$;
$R^1$ is —H, —CH$_3$, —CH$_2$CH$_3$, —CH$_2$CH$_2$CH$_3$, —CH(CH$_3$)$_2$, —C(CH)$_3$, —CH$_2$CH$_2$CH$_2$CH$_3$, —CH(CH$_3$)CH$_2$CH$_3$, or —CH$_2$CH(CH$_3$)$_2$;
$R^2$ is —H, —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)$_2$, —C(CH)$_3$, cycloalkyl, aryl or aralkyl;
n is 0 to 6 inclusive; and
m is 1 to 6 inclusive.

7. The method of claim 6, wherein $R^1$ is —H or —CH$_3$.

8. The method of claim 6, wherein A is —O—; B is —CH$_2$CH$_2$—; and R is —H.

9. The method of claim 6, wherein Y is —CH$_2$CH$_2$CH$_2$—; and $R^1$ is —CH$_3$.

10. The method of claim 6, wherein A is —O—; B is —CH$_2$CH$_2$—; R is —H; Y is —CH$_2$CH$_2$CH$_2$—; and R$^1$ is —CH$_3$.

11. The method of claim 1 or 6, wherein the ratio of said crosslinker to said monomer is about 0.5.

12. The method of claim 1 or 6, wherein the ratio of said crosslinker to said monomer is about 0.4.

13. The method of claim 1 or 6, wherein the ratio of said crosslinker to said monomer is about 0.3.

14. The method of claim 1 or 6, wherein the ratio of said crosslinker to said monomer is about 0.2.

15. The method of claim 1 or 6, wherein the ratio of said crosslinker to said monomer is about 0.1.

16. The method of claim 1 or 6, wherein said gaseous initiator is selected from the group consisting of compounds of formula V:

$$R^3—U—R^4 \qquad \qquad V$$

wherein, independently for each occurrence,
R$^3$ is alkyl, cycloalkyl, aryl or aralkyl;
U is —O—O— or —N=N—; and
R$^4$ is hydrogen, alkyl, cycloalkyl, aryl or aralkyl.

17. The method of claim 16, wherein R$^3$ is —C(CH)$_3$; U is —O—O—; and R$^4$ is —C(CH)$_3$.

* * * * *